(12) United States Patent
Mesher

(10) Patent No.: US 10,908,291 B2
(45) Date of Patent: Feb. 2, 2021

(54) SYSTEM AND METHOD FOR GENERATING AND INTERPRETING POINT CLOUDS OF A RAIL CORRIDOR ALONG A SURVEY PATH

(71) Applicant: TETRA TECH, INC., Pasadena, CA (US)

(72) Inventor: Darel Mesher, Spruce Grove (CA)

(73) Assignee: TETRA TECH, INC., Pasadena, CA (US)

( * ) Notice: Subject to any disclaimer, the term of this patent is extended or adjusted under 35 U.S.C. 154(b) by 0 days.

(21) Appl. No.: 16/876,484

(22) Filed: May 18, 2020

(65) Prior Publication Data

US 2020/0363532 A1  Nov. 19, 2020

Related U.S. Application Data

(60) Provisional application No. 63/016,661, filed on Apr. 28, 2020, provisional application No. 62/988,630,
(Continued)

(51) Int. Cl.
*G01S 17/89* (2020.01)
*G01S 17/87* (2020.01)
(Continued)

(52) U.S. Cl.
CPC ............ *G01S 17/89* (2013.01); *B61L 25/02* (2013.01); *G01S 7/4813* (2013.01); *G01S 7/497* (2013.01);
(Continued)

(58) Field of Classification Search
CPC . G01S 17/89; G01S 17/86; G06T 7/55; G06T 7/73; G06T 2207/10028;
(Continued)

(56) References Cited

U.S. PATENT DOCUMENTS 3,562,419 A  2/1971  Stewart et al.
3,942,000 A  3/1976  Dieringer
(Continued)

FOREIGN PATENT DOCUMENTS

CA  2061014 A1  8/1992
CA  2574428 A1  2/2006
(Continued)

OTHER PUBLICATIONS

US 8,548,242 B1, 10/2013, Longacre, Jr. (withdrawn)
(Continued)

*Primary Examiner* — Utpal D Shah
(74) *Attorney, Agent, or Firm* — Robinson IP Law, PLLC

(57) ABSTRACT

An autonomous system for generating and interpreting point clouds of a rail corridor along a survey path while moving on a railroad corridor assessment platform. The system includes two rear-facing LiDAR sensors configured to scan along scan planes that intersect but not at all points and wherein neither scan plane intersects a main body of any rail car adjoined to a rear end of the railroad corridor assessment platform. The system also includes a plurality of high-resolution cameras for gathering image data from a rail corridor. The LiDAR sensors and the high-resolution cameras are housed in autonomously controlled and temperature controlled protective enclosures.

24 Claims, 15 Drawing Sheets

Related U.S. Application Data filed on Mar. 12, 2020, provisional application No. 62/848,630, filed on May 16, 2019.

(51) Int. Cl.

| | | |
|---|---|---|
| *H04N 5/225* | (2006.01) | |
| *H04N 5/247* | (2006.01) | |
| *G06T 7/55* | (2017.01) | |
| *G06T 7/73* | (2017.01) | |
| *G01S 17/86* | (2020.01) | |
| *G01S 7/481* | (2006.01) | |
| *G01S 7/497* | (2006.01) | |
| *B61L 25/02* | (2006.01) | |
| *H04N 5/232* | (2006.01) | |

(52) U.S. Cl.
CPC .............. *G01S 17/86* (2020.01); *G01S 17/87* (2013.01); *G06T 7/55* (2017.01); *G06T 7/73* (2017.01); *H04N 5/2252* (2013.01); *H04N 5/2253* (2013.01); *H04N 5/23238* (2013.01); *H04N 5/247* (2013.01); *G06T 2207/10028* (2013.01); *G06T 2207/30252* (2013.01)

(58) Field of Classification Search
CPC ........ G06T 2207/30252; H04N 5/2252; H04N 5/2253; H04N 5/23238
See application file for complete search history.

(56) References Cited

U.S. PATENT DOCUMENTS

| | | |
|---|---|---|
| 4,040,738 A | 8/1977 | Wagner |
| 4,198,164 A | 4/1980 | Cantor |
| 4,265,545 A | 5/1981 | Slaker |
| 4,330,775 A | 5/1982 | Iwamoto et al. |
| 4,490,038 A | 12/1984 | Theurer et al. |
| 4,531,837 A | 7/1985 | Panetti |
| 4,554,624 A | 11/1985 | Wickham et al. |
| 4,600,012 A | 7/1986 | Kohayakawa et al. |
| 4,653,316 A | 3/1987 | Fukuhara |
| 4,676,642 A | 6/1987 | French |
| 4,691,565 A | 9/1987 | Theurer |
| 4,700,223 A | 10/1987 | Shoutaro et al. |
| 4,731,853 A | 3/1988 | Hata |
| 4,775,238 A | 10/1988 | Weber |
| 4,781,060 A | 11/1988 | Berndt |
| 4,899,296 A | 2/1990 | Khattak |
| 4,900,153 A | 2/1990 | Weber et al. |
| 4,915,504 A | 4/1990 | Thurston |
| 4,974,168 A | 11/1990 | Marx |
| 5,199,176 A | 4/1993 | Theurer et al. |
| 5,203,089 A | 4/1993 | Trefouel et al. |
| 5,221,044 A | 6/1993 | Guins |
| 5,245,855 A | 9/1993 | Burgel et al. |
| 5,247,338 A | 9/1993 | Danneskiold-Samsoe et al. |
| 5,353,512 A | 10/1994 | Theurer et al. |
| 5,433,111 A | 7/1995 | Hershey et al. |
| 5,487,341 A | 1/1996 | Newman |
| 5,493,499 A | 2/1996 | Theurer et al. |
| 5,612,538 A | 3/1997 | Hackel et al. |
| 5,623,244 A | 4/1997 | Cooper |
| 5,627,508 A | 5/1997 | Cooper et al. |
| 5,671,679 A | 9/1997 | Straub et al. |
| 5,721,685 A | 2/1998 | Holland et al. |
| 5,743,495 A | 4/1998 | Welles |
| 5,744,815 A | 4/1998 | Gurevich et al. |
| 5,757,472 A | 5/1998 | Wangler et al. |
| 5,786,750 A | 7/1998 | Cooper |
| 5,787,815 A | 8/1998 | Andersson et al. |
| 5,791,063 A | 8/1998 | Kesler et al. |
| 5,793,491 A | 8/1998 | Wangler et al. |
| 5,793,492 A | 8/1998 | Vanaki |
| 5,804,731 A | 9/1998 | Jaeggi |
| 5,808,906 A | 9/1998 | Sanchez-Revuelta et al. |
| 5,912,451 A | 6/1999 | Gurevich et al. |
| 5,969,323 A | 10/1999 | Gurevich |
| 5,970,438 A | 10/1999 | Clark et al. |
| 6,025,920 A | 2/2000 | Dec |
| 6,055,322 A | 4/2000 | Salganicoff |
| 6,055,862 A | 5/2000 | Martens |
| 6,062,476 A | 5/2000 | Stern et al. |
| 6,064,428 A | 5/2000 | Trosino et al. |
| 6,069,967 A | 5/2000 | Rozmus et al. |
| 6,128,558 A | 10/2000 | Kernwein |
| 6,243,657 B1 | 6/2001 | Tuck et al. |
| 6,252,977 B1 | 6/2001 | Salganicoff |
| 6,324,912 B1 | 12/2001 | Woon |
| 6,347,265 B1 | 2/2002 | Bidaud |
| 6,356,299 B1 | 3/2002 | Trosino et al. |
| 6,357,297 B1 | 3/2002 | Makino et al. |
| 6,405,141 B1 | 6/2002 | Carr et al. |
| 6,416,020 B1 | 7/2002 | Gronskov |
| 6,496,254 B2 | 12/2002 | Bostrom |
| 6,523,411 B1 | 2/2003 | Mian et al. |
| 6,540,180 B2 | 4/2003 | Anderson |
| 6,570,497 B2 | 5/2003 | Puckette, IV |
| 6,600,999 B2 | 7/2003 | Clark et al. |
| 6,615,648 B1 | 9/2003 | Ferguson et al. |
| 6,647,891 B2 | 11/2003 | Holmes et al. |
| 6,665,066 B2 | 12/2003 | Nair et al. |
| 6,681,160 B2 | 1/2004 | Bidaud |
| 6,698,279 B1 | 3/2004 | Stevenson |
| 6,715,354 B2 | 4/2004 | Wooh |
| 6,768,551 B2 | 7/2004 | Mian et al. |
| 6,768,959 B2 | 7/2004 | Ignagni |
| 6,804,621 B1 | 10/2004 | Pedanckar |
| 6,854,333 B2 | 2/2005 | Wooh |
| 6,862,936 B2 | 3/2005 | Kenderian et al. |
| 6,873,998 B1 | 3/2005 | Dorum |
| 6,909,514 B2 | 6/2005 | Nayebi |
| 7,023,539 B2 | 4/2006 | Kowalski |
| 7,034,272 B1 | 4/2006 | Leonard |
| 7,036,232 B2 | 5/2006 | Casagrande |
| 7,054,762 B2 | 5/2006 | Pagano et al. |
| 7,084,989 B2 | 8/2006 | Johannesson et al. |
| 7,130,753 B2 | 10/2006 | Pedanekar |
| 7,164,476 B2 | 1/2007 | Shima et al. |
| 7,208,733 B2 | 4/2007 | Mian et al. |
| 7,213,789 B1 | 5/2007 | Matzan |
| 7,298,548 B2 | 11/2007 | Mian |
| 7,328,871 B2 | 2/2008 | Mace et al. |
| 7,355,508 B2 | 4/2008 | Mian et al. |
| 7,357,326 B2 | 4/2008 | Hattersley et al. |
| 7,392,117 B1 | 6/2008 | Bilodeau et al. |
| 7,392,595 B2 | 7/2008 | Heimann |
| 7,403,296 B2 | 7/2008 | Farritor et al. |
| 7,412,899 B2 | 8/2008 | Mian et al. |
| 7,463,348 B2 | 12/2008 | Chung |
| 7,499,186 B2 | 3/2009 | Waisanen |
| 7,502,670 B2 | 3/2009 | Harrison |
| 7,516,662 B2 | 4/2009 | Niesen et al. |
| 7,555,954 B2 | 7/2009 | Pagano et al. |
| 7,564,569 B2 | 7/2009 | Mian et al. |
| 7,602,937 B2 | 10/2009 | Mian et al. |
| 7,616,329 B2 | 11/2009 | Villar et al. |
| 7,659,972 B2 | 2/2010 | Magnus et al. |
| 7,680,631 B2 | 3/2010 | Selig et al. |
| 7,681,468 B2 | 3/2010 | Verl et al. |
| 7,698,028 B1 | 4/2010 | Bilodeau et al. |
| 7,755,660 B2 | 7/2010 | Nejikovsky et al. |
| 7,755,774 B2 | 7/2010 | Farritor et al. |
| 7,832,281 B2 | 11/2010 | Mian et al. |
| 7,869,909 B2 | 1/2011 | Harrison |
| 7,882,742 B1 | 2/2011 | Martens |
| 7,899,207 B2 | 3/2011 | Mian et al. |
| 8,006,559 B2 | 8/2011 | Mian et al. |
| 8,079,274 B2 | 12/2011 | Mian et al. |
| 8,081,320 B2 | 12/2011 | Villar et al. |
| 8,111,387 B2 | 2/2012 | Douglas et al. |
| 8,140,250 B2 | 3/2012 | Mian et al. |
| 8,150,105 B2 | 4/2012 | Mian et al. |
| 8,155,809 B1 | 4/2012 | Bilodeau et al. |
| 8,180,590 B2 | 5/2012 | Szwilski et al. |

(56) References Cited

U.S. PATENT DOCUMENTS

| | | |
|---|---|---|
| 8,188,430 B2 | 5/2012 | Mian et al. |
| 8,190,377 B2 | 5/2012 | Fu |
| 8,209,145 B2 | 6/2012 | Paglinco et al. |
| 8,263,953 B2 | 9/2012 | Fomenkar et al. |
| 8,289,526 B2 | 10/2012 | Kilian et al. |
| 8,326,582 B2 | 12/2012 | Mian et al. |
| 8,335,606 B2 | 12/2012 | Mian et al. |
| 8,345,948 B2 | 1/2013 | Zarembski et al. |
| 8,345,099 B2 | 2/2013 | Bloom et al. |
| 8,365,604 B2 | 2/2013 | Kahn |
| 8,405,837 B2 | 3/2013 | Nagle, II et al. |
| 8,412,393 B2 | 4/2013 | Anderson |
| 8,418,563 B2 | 4/2013 | Wigh et al. |
| 8,423,240 B2 | 4/2013 | Mian et al. |
| 8,424,387 B2 | 4/2013 | Wigh et al. |
| 8,478,480 B2 | 7/2013 | Mian et al. |
| 8,485,035 B2 | 7/2013 | Wigh et al. |
| 8,490,887 B2 | 7/2013 | Jones |
| 8,514,387 B2 | 8/2013 | Scherf et al. |
| 8,615,110 B2 * | 12/2013 | Landes .................. G06T 7/001 382/104 |
| 8,625,878 B2 | 1/2014 | Haas et al. |
| 8,649,932 B2 | 2/2014 | Mian et al. |
| 8,655,540 B2 | 2/2014 | Mian et al. |
| 8,682,077 B1 | 3/2014 | Longacre, Jr. |
| 8,700,924 B2 | 4/2014 | Mian et al. |
| 8,711,222 B2 | 4/2014 | Aaron et al. |
| 8,724,904 B2 | 5/2014 | Fujiki |
| 8,806,948 B2 | 8/2014 | Kahn et al. |
| 8,818,585 B2 | 8/2014 | Bartonek |
| 8,820,166 B2 | 9/2014 | Wigh et al. |
| 8,868,291 B2 | 10/2014 | Mian et al. |
| 8,875,635 B2 * | 11/2014 | Turner .................. E01B 27/022 104/2 |
| 8,903,574 B2 | 12/2014 | Cooper et al. |
| 8,925,873 B2 | 1/2015 | Gamache et al. |
| 8,934,007 B2 | 1/2015 | Snead |
| 8,942,426 B2 | 1/2015 | Bar-am |
| 8,958,079 B2 | 2/2015 | Kainer et al. |
| 9,036,025 B2 | 5/2015 | Haas et al. |
| 9,049,433 B1 | 6/2015 | Prince |
| 9,050,984 B2 | 6/2015 | Li et al. |
| 9,121,747 B2 | 9/2015 | Mian et al. |
| 9,134,185 B2 | 9/2015 | Mian et al. |
| 9,175,998 B2 * | 11/2015 | Turner .................. G01F 22/00 |
| 9,177,210 B2 | 11/2015 | King |
| 9,187,104 B2 | 11/2015 | Fang et al. |
| 9,195,907 B1 | 11/2015 | Longacre, Jr. |
| 9,205,849 B2 | 12/2015 | Cooper et al. |
| 9,205,850 B2 | 12/2015 | Shimada |
| 9,212,902 B2 | 12/2015 | Enomoto et al. |
| 9,222,904 B2 | 12/2015 | Harrison |
| 9,234,786 B2 | 1/2016 | Groll et al. |
| 9,255,913 B2 | 2/2016 | Kumar et al. |
| 9,297,787 B2 | 3/2016 | Fisk |
| 9,310,340 B2 | 4/2016 | Mian et al. |
| 9,336,683 B2 | 5/2016 | Inomata et al. |
| 9,340,219 B2 | 5/2016 | Gamache et al. |
| 9,346,476 B2 | 5/2016 | Dargy et al. |
| 9,389,205 B2 | 7/2016 | Mian et al. |
| 9,415,784 B2 | 8/2016 | Bartonek et al. |
| 9,423,415 B2 | 8/2016 | Nanba et al. |
| 9,429,545 B2 | 8/2016 | Havira et al. |
| 9,441,956 B2 | 9/2016 | Kainer et al. |
| 9,446,776 B2 | 9/2016 | Cooper et al. |
| 9,454,816 B2 | 9/2016 | Mian et al. |
| 9,469,198 B2 | 10/2016 | Cooper et al. |
| 9,518,947 B2 | 12/2016 | Bartonek et al. |
| 9,533,698 B2 | 1/2017 | Warta |
| 9,562,878 B2 | 2/2017 | Graham et al. |
| 9,571,796 B2 | 2/2017 | Mian et al. |
| 9,575,007 B2 | 2/2017 | Rao et al. |
| 9,580,091 B2 | 2/2017 | Kraeling et al. |
| 9,581,998 B2 | 2/2017 | Cooper et al. |
| 9,607,446 B2 | 3/2017 | Cooper et al. |
| 9,618,335 B2 | 4/2017 | Mesher |
| 9,619,725 B2 | 4/2017 | King |
| 9,628,762 B2 | 4/2017 | Farritor |
| 9,664,567 B2 | 5/2017 | Sivathanu et al. |
| 9,671,358 B2 | 6/2017 | Cooper et al. |
| 9,689,760 B2 | 6/2017 | Lanza di Scalea et al. |
| 9,714,043 B2 | 7/2017 | Mian et al. |
| 9,752,993 B1 | 9/2017 | Thompson et al. |
| 9,771,090 B2 | 9/2017 | Warta |
| 9,796,400 B2 | 10/2017 | Puttagunta et al. |
| 9,810,533 B2 | 11/2017 | Fosburgh et al. |
| 9,825,662 B2 | 11/2017 | Mian et al. |
| 9,849,894 B2 | 12/2017 | Mesher |
| 9,849,895 B2 | 12/2017 | Mesher |
| 9,860,962 B2 | 1/2018 | Mesher |
| 9,873,442 B2 | 1/2018 | Mesher |
| 9,921,584 B2 | 3/2018 | Rao et al. |
| 9,922,416 B2 | 3/2018 | Mian et al. |
| 9,950,716 B2 | 4/2018 | English |
| 9,950,720 B2 | 4/2018 | Mesher |
| 9,981,671 B2 | 5/2018 | Fraser et al. |
| 9,981,675 B2 | 5/2018 | Cooper et al. |
| 9,983,593 B2 | 5/2018 | Cooper et al. |
| 9,989,498 B2 | 6/2018 | Lanza di Scalea et al. |
| 10,035,498 B2 | 7/2018 | Richardson et al. |
| 10,040,463 B2 | 8/2018 | Singh |
| 10,043,154 B2 | 8/2018 | King |
| 10,077,061 B2 | 9/2018 | Schmidt et al. |
| 10,081,376 B2 | 9/2018 | Singh |
| 10,086,857 B2 | 10/2018 | Puttagunta et al. |
| 10,167,003 B1 | 1/2019 | Bilodeau |
| 10,286,877 B2 | 5/2019 | Lopez Galera et al. |
| 10,322,734 B2 | 6/2019 | Mesher |
| 10,349,491 B2 | 7/2019 | Mesher |
| 10,352,831 B2 | 7/2019 | Kondo et al. |
| 10,362,293 B2 | 7/2019 | Mesher |
| 10,384,697 B2 | 8/2019 | Mesher |
| 10,401,500 B2 | 9/2019 | Yang et al. |
| 10,408,606 B1 * | 9/2019 | Raab .................. G01S 17/89 |
| 10,414,416 B2 | 9/2019 | Hampapur |
| 10,502,831 B2 | 12/2019 | Eichenholz |
| 10,518,791 B2 * | 12/2019 | Singh .................. B61L 23/047 |
| 10,582,187 B2 | 3/2020 | Mesher |
| 10,611,389 B2 | 4/2020 | Khosla |
| 10,613,550 B2 | 4/2020 | Khosla |
| 10,616,556 B2 | 4/2020 | Mesher |
| 10,616,557 B2 | 4/2020 | Mesher |
| 10,616,558 B2 | 4/2020 | Mesher |
| 10,618,537 B2 | 4/2020 | Khosla |
| 10,625,760 B2 | 4/2020 | Mesher |
| 10,730,538 B2 | 8/2020 | Mesher |
| 10,796,192 B2 | 10/2020 | Fernandez |
| 10,816,347 B2 | 10/2020 | Wygant et al. |
| 10,822,008 B2 | 11/2020 | Wade |
| 2001/0045495 A1 | 11/2001 | Olson et al. |
| 2002/0065610 A1 | 5/2002 | Clark et al. |
| 2002/0070283 A1 | 6/2002 | Young |
| 2002/0093487 A1 | 7/2002 | Rosenberg |
| 2002/0099507 A1 | 7/2002 | Clark et al. |
| 2002/0150278 A1 | 10/2002 | Wustefeld |
| 2002/0196456 A1 | 12/2002 | Komiya et al. |
| 2003/0059087 A1 | 3/2003 | Waslowski et al. |
| 2003/0062414 A1 | 4/2003 | Tsikos et al. |
| 2003/0072001 A1 | 4/2003 | Mian et al. |
| 2003/0075675 A1 | 4/2003 | Braune et al. |
| 2003/0140509 A1 | 7/2003 | Casagrande |
| 2003/0160193 A1 | 8/2003 | Sanchez Reveulta et al. |
| 2003/0164053 A1 | 9/2003 | Ignagni |
| 2004/0021858 A1 | 2/2004 | Shima et al. |
| 2004/0084069 A1 | 5/2004 | Woodard |
| 2004/0088891 A1 | 5/2004 | Theurer |
| 2004/0122569 A1 | 6/2004 | Bidaud |
| 2004/0189452 A1 | 9/2004 | Li |
| 2004/0247157 A1 | 12/2004 | Lages |
| 2004/0263624 A1 | 12/2004 | Nejikovsky |
| 2005/0121539 A1 | 6/2005 | Takada et al. |
| 2005/0279240 A1 | 12/2005 | Pedanekar et al. |
| 2006/0017911 A1 | 1/2006 | Villar |
| 2006/0098843 A1 | 5/2006 | Chew |

(56) References Cited

U.S. PATENT DOCUMENTS

| | | |
|---|---|---|
| 2006/0171704 A1 | 8/2006 | Bingle |
| 2006/0231685 A1 | 10/2006 | Mace et al. |
| 2007/0136029 A1 | 6/2007 | Selig et al. |
| 2007/0150130 A1 | 6/2007 | Welles |
| 2007/0211145 A1 | 9/2007 | Kilian et al. |
| 2007/0265780 A1 | 11/2007 | Kesler et al. |
| 2007/0289478 A1 | 12/2007 | Becker et al. |
| 2008/0007724 A1 | 1/2008 | Chung |
| 2008/0177507 A1 | 7/2008 | Mian et al. |
| 2008/0212106 A1 | 9/2008 | Hoffmann |
| 2008/0298674 A1 | 12/2008 | Baker |
| 2008/0304065 A1 | 12/2008 | Hesser |
| 2008/0304083 A1 | 12/2008 | Farritor et al. |
| 2009/0040503 A1 | 2/2009 | Kilian |
| 2009/0073428 A1 | 3/2009 | Magnus |
| 2009/0196486 A1 | 8/2009 | Distante et al. |
| 2009/0250533 A1 | 10/2009 | Akiyama et al. |
| 2009/0273788 A1 | 11/2009 | Nagle et al. |
| 2009/0319197 A1 | 12/2009 | Villar et al. |
| 2010/0007551 A1 | 1/2010 | Pagliuco |
| 2010/0026551 A1 | 2/2010 | Szwilski |
| 2010/0106309 A1 | 4/2010 | Grohman et al. |
| 2010/0289891 A1 | 11/2010 | Akiyama |
| 2011/0064273 A1 | 3/2011 | Zarembski et al. |
| 2011/0209549 A1 | 9/2011 | Kahn |
| 2012/0026352 A1 | 2/2012 | Natroshvilli et al. |
| 2012/0051643 A1 | 3/2012 | Ha et al. |
| 2012/0062731 A1 | 3/2012 | Enomoto et al. |
| 2012/0192756 A1 | 8/2012 | Miller et al. |
| 2012/0218868 A1 | 8/2012 | Kahn et al. |
| 2012/0245908 A1 | 9/2012 | Berggren |
| 2012/0263342 A1 | 10/2012 | Haas |
| 2012/0300060 A1 | 11/2012 | Farritor |
| 2013/0070083 A1 | 3/2013 | Snead |
| 2013/0092758 A1 | 4/2013 | Tanaka et al. |
| 2013/0096739 A1 | 4/2013 | Landes et al. |
| 2013/0170709 A1 | 7/2013 | Distante et al. |
| 2013/0191070 A1 | 7/2013 | Kainer |
| 2013/0230212 A1* | 9/2013 | Landes ............ G06K 9/00791 382/104 |
| 2013/0313372 A1 | 11/2013 | Gamache et al. |
| 2013/0317676 A1 | 11/2013 | Cooper et al. |
| 2014/0069193 A1 | 3/2014 | Graham et al. |
| 2014/0129154 A1 | 5/2014 | Cooper |
| 2014/0142868 A1 | 5/2014 | Bidaud |
| 2014/0151512 A1 | 6/2014 | Cooper |
| 2014/0177656 A1 | 6/2014 | Mian et al. |
| 2014/0333771 A1 | 11/2014 | Mian et al. |
| 2014/0339374 A1 | 11/2014 | Mian et al. |
| 2015/0131108 A1 | 5/2015 | Kainer et al. |
| 2015/0219487 A1 | 8/2015 | Maraini |
| 2015/0225002 A1 | 8/2015 | Branka et al. |
| 2015/0268172 A1 | 9/2015 | Naithani et al. |
| 2015/0269722 A1 | 9/2015 | Naithani et al. |
| 2015/0284912 A1 | 10/2015 | Delmonic et al. |
| 2015/0285688 A1 | 10/2015 | Naithani et al. |
| 2016/0002865 A1 | 1/2016 | English et al. |
| 2016/0039439 A1 | 2/2016 | Fahmy et al. |
| 2016/0059623 A1 | 3/2016 | Kilian |
| 2016/0121912 A1* | 5/2016 | Puttagunta ............ B61L 27/04 701/19 |
| 2016/0159381 A1 | 6/2016 | Fahmy |
| 2016/0207551 A1 | 7/2016 | Mesher |
| 2016/0209003 A1 | 7/2016 | Mesher |
| 2016/0212826 A1 | 7/2016 | Mesher |
| 2016/0221592 A1* | 8/2016 | Puttagunta ............ B61L 25/04 |
| 2016/0249040 A1 | 8/2016 | Mesher |
| 2016/0282108 A1 | 9/2016 | Martinod Restrepo et al. |
| 2016/0304104 A1 | 10/2016 | Witte et al. |
| 2016/0305915 A1 | 10/2016 | Witte et al. |
| 2016/0312412 A1 | 10/2016 | Schrunk, III |
| 2016/0318530 A1 | 11/2016 | Johnson |
| 2016/0321513 A1 | 11/2016 | Mitti et al. |
| 2016/0325767 A1 | 11/2016 | LeFebvre et al. |
| 2016/0368510 A1 | 12/2016 | Simon et al. |
| 2017/0029001 A1 | 2/2017 | Berggren |
| 2017/0034892 A1 | 2/2017 | Mesher |
| 2017/0066459 A1 | 3/2017 | Singh |
| 2017/0106885 A1 | 4/2017 | Singh |
| 2017/0106887 A1 | 4/2017 | Mian et al. |
| 2017/0182980 A1 | 6/2017 | Davies et al. |
| 2017/0203775 A1 | 7/2017 | Mesher |
| 2017/0205379 A1 | 7/2017 | Prince et al. |
| 2017/0267264 A1 | 9/2017 | English et al. |
| 2017/0297536 A1 | 10/2017 | Giraud et al. |
| 2017/0305442 A1 | 10/2017 | Viviani |
| 2017/0313286 A1 | 11/2017 | Giraud et al. |
| 2017/0313332 A1 | 11/2017 | Paget et al. |
| 2017/0336293 A1 | 11/2017 | Kondo et al. |
| 2018/0038957 A1 | 2/2018 | Kawazoe et al. |
| 2018/0039842 A1 | 2/2018 | Schuchmann et al. |
| 2018/0057030 A1 | 3/2018 | Puttagunta et al. |
| 2018/0079433 A1 | 3/2018 | Mesher |
| 2018/0079434 A1 | 3/2018 | Mesher |
| 2018/0106000 A1 | 4/2018 | Fruehwirt |
| 2018/0120440 A1 | 5/2018 | O'Keeffe |
| 2018/0127006 A1 | 5/2018 | Wade |
| 2018/0220512 A1 | 8/2018 | Mesher |
| 2018/0222504 A1 | 8/2018 | Birch et al. |
| 2018/0276494 A1 | 9/2018 | Fernandez |
| 2018/0281829 A1 | 10/2018 | Euston et al. |
| 2018/0339720 A1* | 11/2018 | Singh ............ G06K 9/4604 |
| 2018/0370552 A1 | 12/2018 | Puttagunta et al. |
| 2018/0372875 A1 | 12/2018 | Juelsgaard et al. |
| 2019/0039633 A1 | 2/2019 | Li |
| 2019/0054937 A1* | 2/2019 | Graetz ............ B61L 23/044 |
| 2019/0107607 A1 | 4/2019 | Danziger |
| 2019/0135315 A1 | 5/2019 | Dargy et al. |
| 2019/0156569 A1* | 5/2019 | Jung ............ G06T 7/12 |
| 2019/0179026 A1 | 6/2019 | Englard et al. |
| 2019/0310470 A1 | 10/2019 | Weindort et al. |
| 2019/0349563 A1 | 11/2019 | Mesher |
| 2019/0349564 A1 | 11/2019 | Mesher |
| 2019/0349565 A1 | 11/2019 | Mesher |
| 2019/0349566 A1 | 11/2019 | Mesher |
| 2019/0357337 A1 | 11/2019 | Mesher |
| 2019/0367060 A1 | 12/2019 | Mesher |
| 2019/0367061 A1 | 12/2019 | Mesher |
| 2020/0025578 A1* | 1/2020 | Wygant ............ G01S 7/4817 |
| 2020/0034637 A1 | 1/2020 | Olson et al. |
| 2020/0086903 A1 | 3/2020 | Mesher |
| 2020/0116865 A1 | 4/2020 | Yang et al. |
| 2020/0156677 A1 | 5/2020 | Mesher |
| 2020/0160733 A1 | 5/2020 | Dick et al. |
| 2020/0164904 A1 | 5/2020 | Dick et al. |
| 2020/0180667 A1 | 6/2020 | Kim et al. |
| 2020/0198672 A1 | 6/2020 | Underwood et al. |
| 2020/0221066 A1 | 7/2020 | Mesher |
| 2020/0231193 A1 | 7/2020 | Chen et al. |
| 2020/0239049 A1 | 7/2020 | Dick et al. |

FOREIGN PATENT DOCUMENTS

| | | |
|---|---|---|
| CA | 2607634 A1 | 4/2008 |
| CA | 2574428 C | 10/2009 |
| CA | 2782341 A1 | 6/2011 |
| CA | 2844113 | 2/2013 |
| CA | 2986580 | 9/2014 |
| CA | 2867560 A1 | 4/2015 |
| CA | 2607634 C | 6/2015 |
| CA | 2945614 A1 | 10/2015 |
| CA | 2732971 | 1/2016 |
| CA | 2996128 | 3/2016 |
| CA | 2860073 | 5/2016 |
| CA | 2867560 C | 7/2017 |
| CN | 106291538 A | 1/2017 |
| CN | 106364503 A | 2/2017 |
| CN | 106373191 A | 2/2017 |
| CN | 106384190 A | 2/2017 |
| CN | 104535652 B | 6/2017 |
| CN | 107688024 A | 2/2018 |
| CN | 206984011 U | 2/2018 |
| CN | 108009484 A | 5/2018 |
| CN | 108657222 | 10/2018 |

(56) References Cited

FOREIGN PATENT DOCUMENTS

| | | |
|---|---|---|
| DE | 19831176 | 1/2000 |
| DE | 19831215 | 1/2000 |
| DE | 10040139 | 7/2002 |
| DE | 19826422 | 9/2002 |
| DE | 60015268 | 3/2005 |
| DE | 19943744 | 1/2006 |
| DE | 19919604 | 8/2009 |
| DE | 102012207427 | 7/2013 |
| DE | 102009018036 | 2/2014 |
| DE | 102014119056 | 6/2016 |
| EP | 0274081 | 7/1988 |
| EP | 1079322 | 2/2001 |
| EP | 1146353 | 10/2001 |
| EP | 1158460 | 11/2001 |
| EP | 1168269 | 1/2002 |
| EP | 1197417 A1 | 4/2002 |
| EP | 1098803 | 1/2003 |
| EP | 1600351 | 1/2007 |
| EP | 1892503 | 7/2007 |
| EP | 1918702 A2 | 5/2008 |
| EP | 1964026 | 9/2008 |
| EP | 1992167 | 5/2016 |
| EP | 3024123 | 5/2016 |
| EP | 2806065 | 9/2016 |
| EP | 3138753 A1 | 3/2017 |
| EP | 3138754 A1 | 3/2017 |
| EP | 2697738 | 8/2017 |
| EP | 2697738 B1 | 8/2017 |
| EP | 2998927 | 9/2018 |
| EP | 3561501 | 10/2019 |
| EP | 3105599 | 4/2020 |
| EP | 3433154 | 6/2020 |
| EP | 3658439 | 6/2020 |
| EP | 3689706 | 8/2020 |
| FR | 2674809 | 10/1992 |
| FR | 3049255 A1 | 9/2017 |
| FR | 3077553 | 2/2018 |
| FR | 3049255 B1 | 4/2018 |
| FR | 3052416 | 7/2019 |
| FR | 3077553 | 8/2019 |
| GB | 2265779 | 10/1993 |
| GB | 2378344 | 2/2003 |
| GB | 2383635 B | 6/2005 |
| GB | 2536746 | 9/2016 |
| GB | 2536746 B | 3/2017 |
| JP | 60039555 | 3/1985 |
| JP | 63302314 | 12/1988 |
| JP | 6011316 | 1/1994 |
| JP | 06322707 | 11/1994 |
| JP | H07146131 | 6/1995 |
| JP | 7280532 | 10/1995 |
| JP | H07294443 | 11/1995 |
| JP | H07294444 | 11/1995 |
| JP | 10332324 | 12/1998 |
| JP | 11172606 | 6/1999 |
| JP | 2000221146 | 8/2000 |
| JP | 2000241360 | 9/2000 |
| JP | H0924828 | 7/2002 |
| JP | 2002294610 | 10/2002 |
| JP | 2003074004 | 3/2003 |
| JP | 2003121556 | 4/2003 |
| JP | 2004132881 | 4/2004 |
| JP | 2007240342 | 9/2007 |
| JP | 4008082 | 11/2007 |
| JP | 2010229642 A | 10/2010 |
| JP | 5283548 | 9/2013 |
| JP | 5812595 | 11/2015 |
| JP | 2015209205 | 11/2015 |
| JP | 2016191264 A | 11/2016 |
| JP | 6068012 B2 | 1/2017 |
| JP | 2017020862 A | 1/2017 |
| JP | 6192717 B2 | 9/2017 |
| JP | 6327413 B2 | 5/2018 |
| JP | 6425990 B2 | 11/2018 |
| JP | 2019065650 A | 4/2019 |
| JP | 6530979 B2 | 6/2019 |
| KR | 101562635 | 10/2015 |
| KR | 101706271 B1 | 2/2017 |
| KR | 1020180061929 A | 6/2018 |
| RU | 2142892 | 12/1999 |
| RU | 101851 | 1/2011 |
| SU | 1418105 | 8/1988 |
| WO | 2000/05576 A2 | 2/2000 |
| WO | 2000/08459 | 2/2000 |
| WO | 2000-73118 A1 | 12/2000 |
| WO | 2001/066401 A1 | 9/2001 |
| WO | 2001066401 | 5/2003 |
| WO | 2005/036199 A2 | 4/2005 |
| WO | 2005036199 | 4/2005 |
| WO | 2005098352 | 10/2005 |
| WO | 2006008292 | 1/2006 |
| WO | 2006014893 | 2/2006 |
| WO | 2011002534 | 1/2011 |
| WO | 2012142548 A1 | 10/2012 |
| WO | 2013146502 | 3/2013 |
| WO | 2013/177393 A1 | 11/2013 |
| WO | 2014017015 | 1/2014 |
| WO | 2015160300 A1 | 10/2015 |
| WO | 2015/165560 A1 | 11/2015 |
| WO | 2016/008201 A1 | 1/2016 |
| WO | 2016/027072 A1 | 2/2016 |
| WO | 2016007393 A3 | 7/2016 |
| WO | 2016168576 | 10/2016 |
| WO | 2016168623 | 10/2016 |
| WO | 2017159701 A1 | 9/2017 |
| WO | 2018158712 | 9/2018 |
| WO | 2018207469 | 11/2018 |
| WO | 2018208153 | 11/2018 |
| WO | 2018210441 | 11/2018 |
| WO | 2019/023613 A1 | 1/2019 |
| WO | 2019/023658 A1 | 1/2019 |
| WO | 2019023613 | 1/2019 |
| WO | 2019023658 | 1/2019 |
| WO | 2019086158 | 5/2019 |
| WO | 2019212693 | 11/2019 |
| WO | 2020078703 | 4/2020 |

OTHER PUBLICATIONS

US Patent and Trademark Office, Non-Final Office Action for U.S. Appl. No. 14/725,490 dated Feb. 23, 2018.
Shawn Landers et al., "Development and Calibration of a Pavement Surface Performance Measure and Prediction Models for the British Columbia Pavement Management System" (2002).
Zheng Wu, "Hybrid Multi-Objective Optimization Models for Managing Pavement Assetts" (Jan. 25, 2008).
"Pavement Condition Index 101", OGRA's Milestones (Dec. 2009).
"Rail Radar Bringing the Track Into the Office" presentation given to CN Rail Engineering on Jan. 21, 2011.
Rail Radar, Inc. Industrial Research Assistance Program Application (IRAP) (Aug. 10, 2012).
"Rail Radar Automated Track Assessment" paper distributed at the Association of American Railways (AAR) Transportation Test Center in Oct. 2010 by Rail Radar, Inc.
US Patent and Trademark Office, Non-Final Office Action for U.S. Appl. No. 14/725,490 dated Mar. 30, 2017.
US Patent and Trademark Office, Final Office Action for U.S. Appl. No. 14/725,490 dated Aug. 16, 2017.
Kantor, et al., "Automatic Railway Classification Using Surface and Subsurface Measurements" Proceedings of the 3rd International Conference on Field and Service Robitics, pp. 43-48 (2001).
Magnes, Daniel L., "Non-Contact Technology for Track Speed Rail Measurements (ORIAN)" SPIE vol. 2458, pp. 45-51 (1995).
Ryabichenko, et al. "CCD Photonic System for Rail Width Measurement" SPIE vol. 3901, pp. 37-44 (1999).
Gingras, Dennis, "Optics and Photonics Used in Road Transportation" (1998).
Liviu Bursanescu and François Blais, "Automated Pavement Distress Data Collection and Analysis: a 3-D Approach" (1997).
US Patent and Trademark Office, Non-Final Office Action for U.S. Appl. No. 14/724,925 dated Feb. 26, 2016.

(56) References Cited

OTHER PUBLICATIONS

US Patent and Trademark Office, Non-Final Office Action for U.S. Appl. No. 14/724,890 dated Jul. 29, 2016.
US Patent and Trademark Office, Final Office Action for U.S. Appl. No. 14/724,890 dated Nov. 10, 2016.
US Patent and Trademark Office, Non-Final Office Action for U.S. Appl. No. 14/724,890 dated Mar. 24, 2017.
Korean Intellectual Property Office, International Search Report for Int. App. No. PCT/IB2018/058574 dated Feb. 27, 2019.
Korean Intellectual Property Office, Written Opinion of the International Searching Authority for Int. App. No. PCT/IB2018/058574 dated Feb. 27, 2019.
US Patent and Trademark Office, Non-Final Office Action for U.S. Appl. No. 16/255,928 dated Oct. 18, 2019.
US Patent and Trademark Office, Final Office Action for U.S. Appl. No. 16/127,956 dated Jul. 9, 2019.
International Report on Patentability, PCT App. Ser. No. PCT/US2020/033374 dated Aug. 14, 2020.
US Patent and Trademark Office, Non-Final Office Action for U.S. Appl. No. 16/127,956 dated Dec. 31, 2018.
D.D. Davis et al., "Tie Performance—A Progress Report of the Des Plaines Test Site," Report No. R-746, Association of American Railroads Research and Test Department (Apr. 1990).
Mattias Johanneson, "Architectures for Sheet-of-Light Range Imaging," Report No. LiTH-ISY-I-1335, Image Processing Group, Department of Electrical Engineering, Linköping University (Feb. 27, 1992).
U.S. Appl. No. 60/584,769, "System & Method for Inspecting Railroad Track" by John Nagle & Steven C. Orrell.
Mattias Johannesson, "Sheet-of-light Range Imaging," Linköping Studies in Science and Technology. Dissertations No. 399 (1995).
M. Johannesson, SIMD Architectures for Range and Radar Imaging, PhD thesis, University of Linköping (1995).
Erik Åstrand, "Automatic Inspection of Sawn Wood," Linköping Studies in Science and Technology. Dissertations. No. 424 (1996).
Mattias Johannesson, "Sheet-of-Light range imaging experiments with MAPP2200," Report No. LiTH-ISY-I-1401, Image Processing Group, Department of Electrical Engineering, Linköping University (Sep. 28, 1992).
M. de Bakker et al., "A Smart Range Image Sensor," Proceedings of the 24th European Solid-State Circuits Conference (1998):208-11;xii+514.
Dr. Mats Gokstorp et al., "Smart Vision Sensors," International Conference on Image Processing (Oct. 4-7, 1998), Institute of Electrical and Electronics Engineers, Inc.
Mattias Johanneson, et al., "An Image Sensor for Sheet-of-Light Range Imaging," IAPR Workshop on Machine Vision Applications (Dec. 7-9, 1992).
Mattias Johannesson, "Can Sorting using sheet-of-light range imaging and MAPP2200," Institute of Electrical and Electronics Engineers; International Conference on Systems, Man and Cybernetics (Oct. 17-20, 1993).
Michiel de Bakker, et al., "Smart PSD array for sheet-of-light range imaging," The International Society for Optical Engineering. Sensors and Camera Systems for Scientific, Industrial, and Digital Photography Applications (Jan. 24-26, 2000).
Umayal Chidambaram, "Edge Extraction of Color and Range Images," (Dec. 2003).
Franz Pernkopf et al., "Detection of surface defects on raw milled steel blocks using range imaging" The International Society for Optical Engineering. Machine Vision Applications in Industrial Inspection X (Jan. 21-22, 2002).
Murhed, Anders, "IVP Integrated Vision Products," Pulp and Paper International 44.12 (Dec. 1, 2002).
Anders Astrand, "Smart Image Sensors," Linköping Studies in Science and Technology. Dissertations. No. 319 (1993).
Mattias Johannesson et al., "Five Contributions to the Art of Sheet-of-light Range Imaging on MAPP2200," Report No. LiTH-ISY-R-1611, Image Processing Group, Department of Electrical Engineering, Linköping University (Apr. 14, 1994).

Federal Register, vol. 73 (70695-70696).
Newman et al., "A Survey of Automated Visual Inspection," Computer Vision an Image Understanding vol. 61, No. 2, March, pp. 231-262, 1995.
J. Velten et al., "Application of a Brightness-Adapted Edge Detector for Real-Time Railroad Tie Detection in Video Images," Institute of Electrical and Electronics Engineers (1999).
R. Gordon Kennedy, "Problems of Cartographic Design in Geographic Information Systems for Transportation," Cartographic Perspectives (Jul. 20, 1999).
Richard Reiff, "An Evaluation of Remediation Techniques for Concrete Tie Rail Seat Abrasion in the Fast Environment," American Railway Engineering Association, Bulletin 753 (1995).
Russell H. Lutch et al., "Causes and Preventative Methods for Rail Seat Abrasion in North America's Railroads," Conference Paper (Oct. 2014).
Nigel Peters and Steven R. Mattson, "CN 60E Concrete Tie Development," AREMA: 25 (2003).
Federal Register, vol. 76, No. 175, pp. 55819-55825.
National Transportation Safety Board, "Railroad Accident Brief" (NTSB/RAB-06/03).
Arthur L. Clouse et al. "Track Inspection Into the 21st Century" (Sep. 19, 2006).
Federal Register, vol. 76, No. 63, pp. 18001-18346 (18073).
Railroad Safety Advisory Committee (RSAC), Minutes of Meeting, Dec. 10, 2008, Washington, D.C.
Dennis P. Curtin, "An Extension to the Textbook of Digital Photography, Pixels and Images" (2007).
Holland L.P.'s Combined Motion for Early Markman Claim Construction and Summary Judgment of Non-Infringement in *Georgetown Rail Equipment Company v. Holland L.P.*, (E.D. Tex.) (Tyler) (6:13-cv-366).
Georgetown Rail Equipment Company's Response to Holland L.P.'s Combined Motion for Early Markman Claim Construction and Summary Judgment of Non-Infringement in *Georgetown Rail Equipment Company v. Holland L.P.*, (E.D. Tex.) (Tyler) (6:13-cv-366).
Georgetown Rail Equipment Company's P.R. 4-5(a) Opening Markman Claim Construction Brief in *Georgetown Rail Equipment Company v. Holland L.P.*, (E.D. Tex.) (Tyler) (6:13-cv-366).
Holland L.P.'s Responsive Markman Claim Construction Brief Under P.R. 4-5 in *Georgetown Rail Equipment Company v. Holland L.P.*, (E.D. Tex.) (Tyler) (6:13-cv-366).
Claim Construction Memorandum Opinion and Order in *Georgetown Rail Equipment Company v. Holland L.P.*, (E.D. Tex) (Tyler) (6:13-cv-366).
Public Judgment and Reasons in *Georgetown Rail Equipment Company v. Rail Radar Inc.* and *Tetra Tech EBA Inc.* (T-896-15) (2018 FC 70).
US Patent and Trademark Office, Final Office Action for U.S. Appl. No. 16/255,928 dated Apr. 27, 2020.
US Patent and Trademark Office, Non-Final Office Action for U.S. Appl. No. 16/742,057 dated May 26, 2020.
Invitation to Pay Additional Fees, PCT App. Ser. No. PCT/US2020/033449 dated Jul. 9, 2020.
International Report on Patentability, PCT App. Ser. No. PCT/IB2018/058574 dated Aug. 6, 2020.
T. Kanade, ed., Three-Dimensional Machine Vision, Kluwer Academic Publishers (1987) [Part 1].
T. Kanade, ed., Three-Dimensional Machine Vision, Kluwer Academic Publishers (1987) [Part 2].
D.D. Davis et al., "Tie Condition Inspection a Case Study of Tie Failure Rate, Mods, and Clustering," Report No. R-714, Association of American Railroads Research and Test Department (Jul. 1989).
John Choros et al., "Prevention of Derailments due to Concrete Tie Rail Seat Deterioration," Proceedings of ASME/IEEE Joint Rail Conference & Internal Combustion Engine Spring Technical Conference. No. 40096 (2007).
International Search Report and Written Opinion of the International Searching Authority, PCT App. Ser. No. PCT/US2020/033449 dated Sep. 14, 2020 (including copy of Kovalev et al. "Freight car models and their computer-aided dynamic analysis", Multibody System Dynamics, Nov. 2009).

(56) References Cited

OTHER PUBLICATIONS

Julio Molleda et al., "A Profile Measurement System for Rail Manufacturing using Multiple Laser Range Finders" (2015).

* cited by examiner

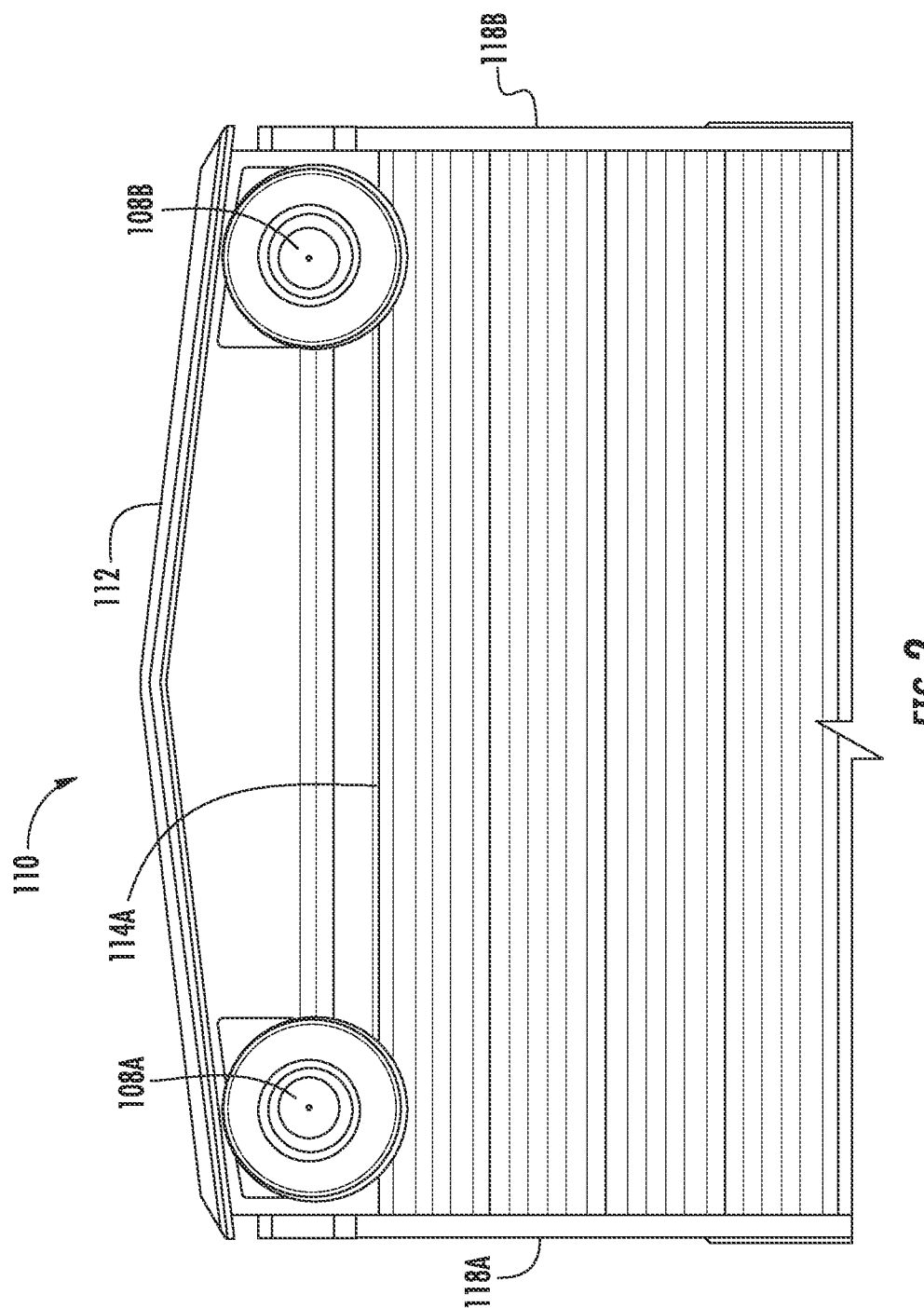

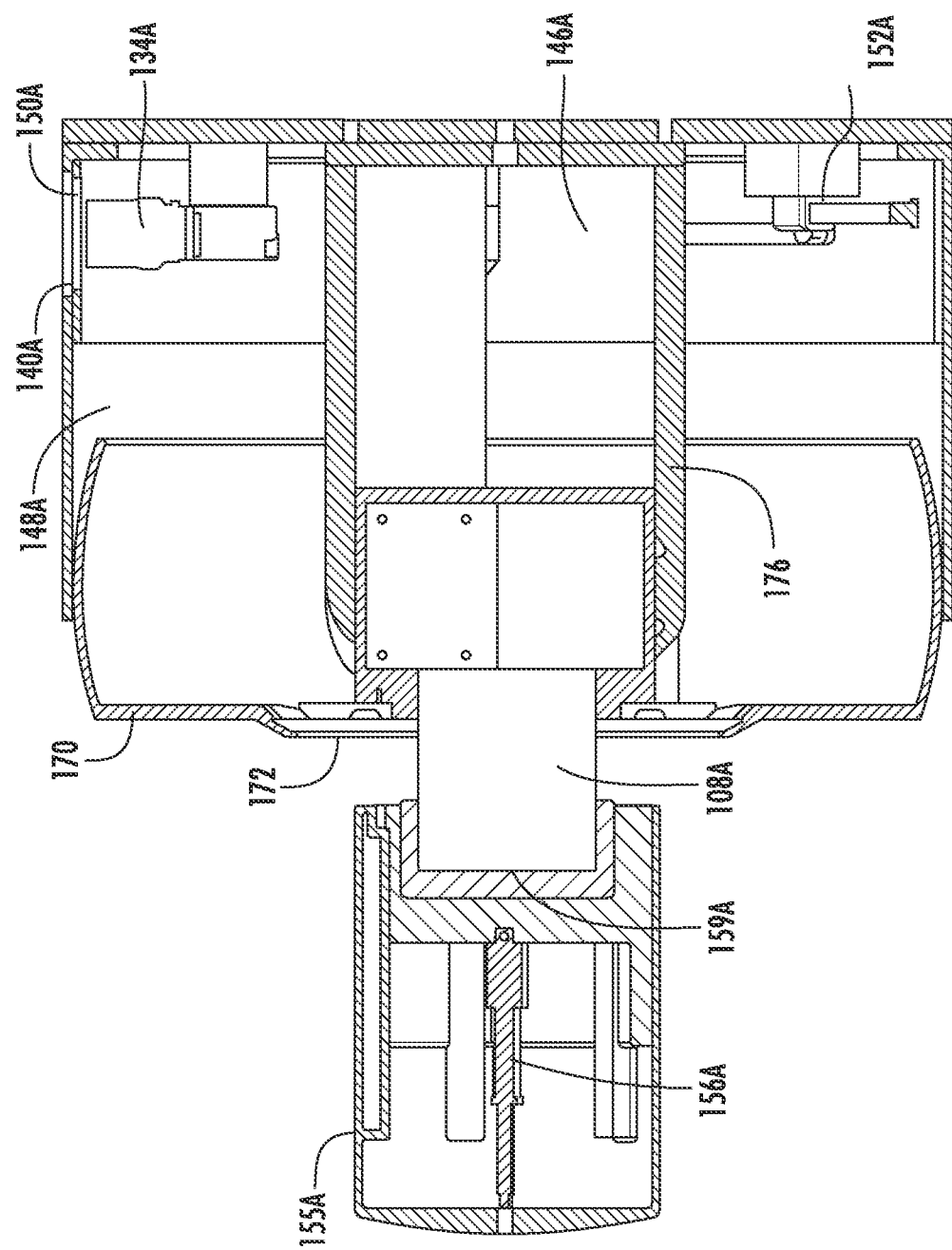

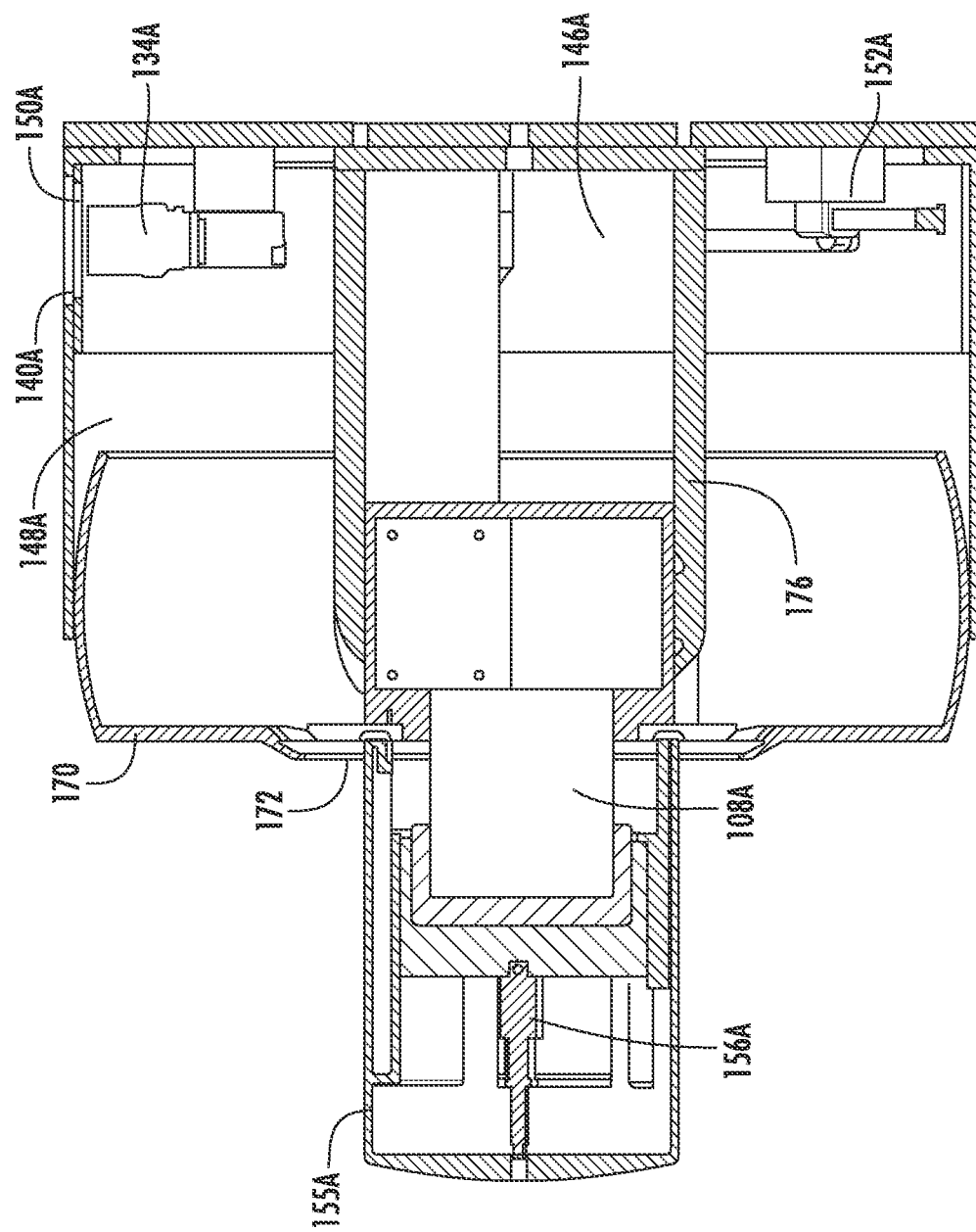

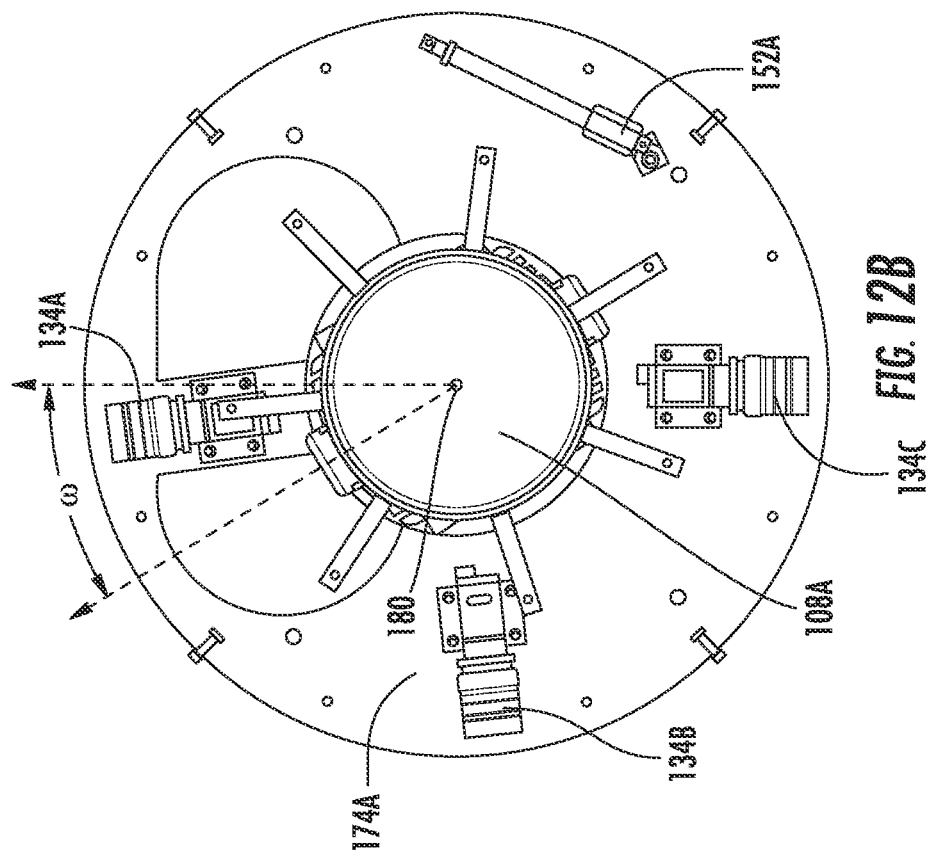
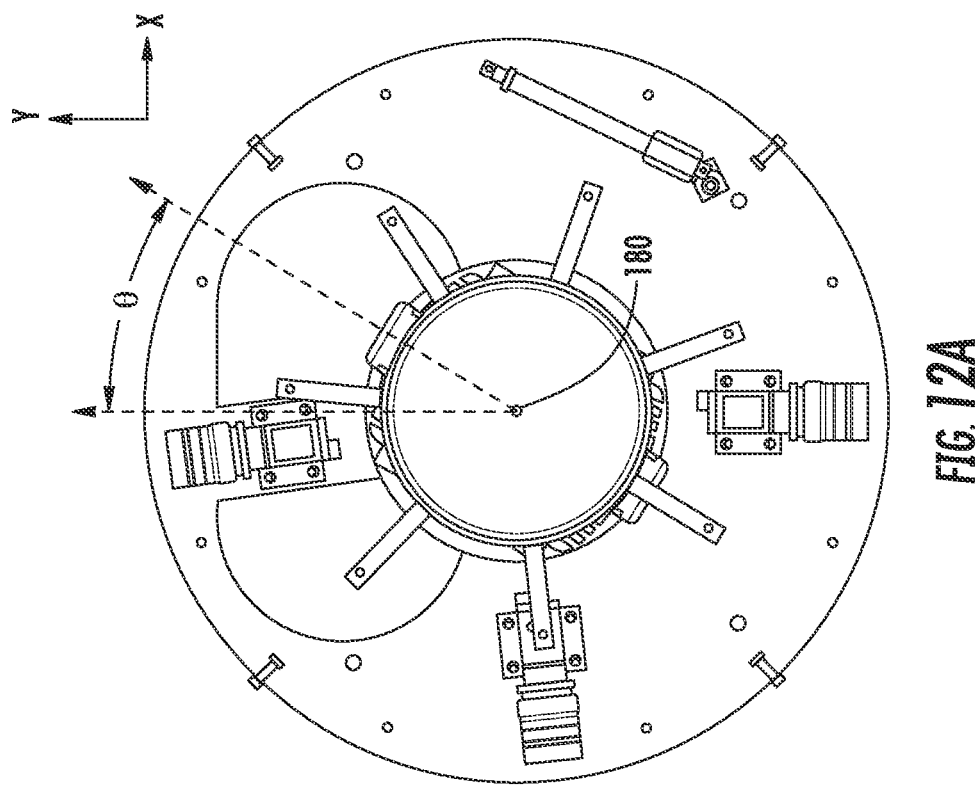

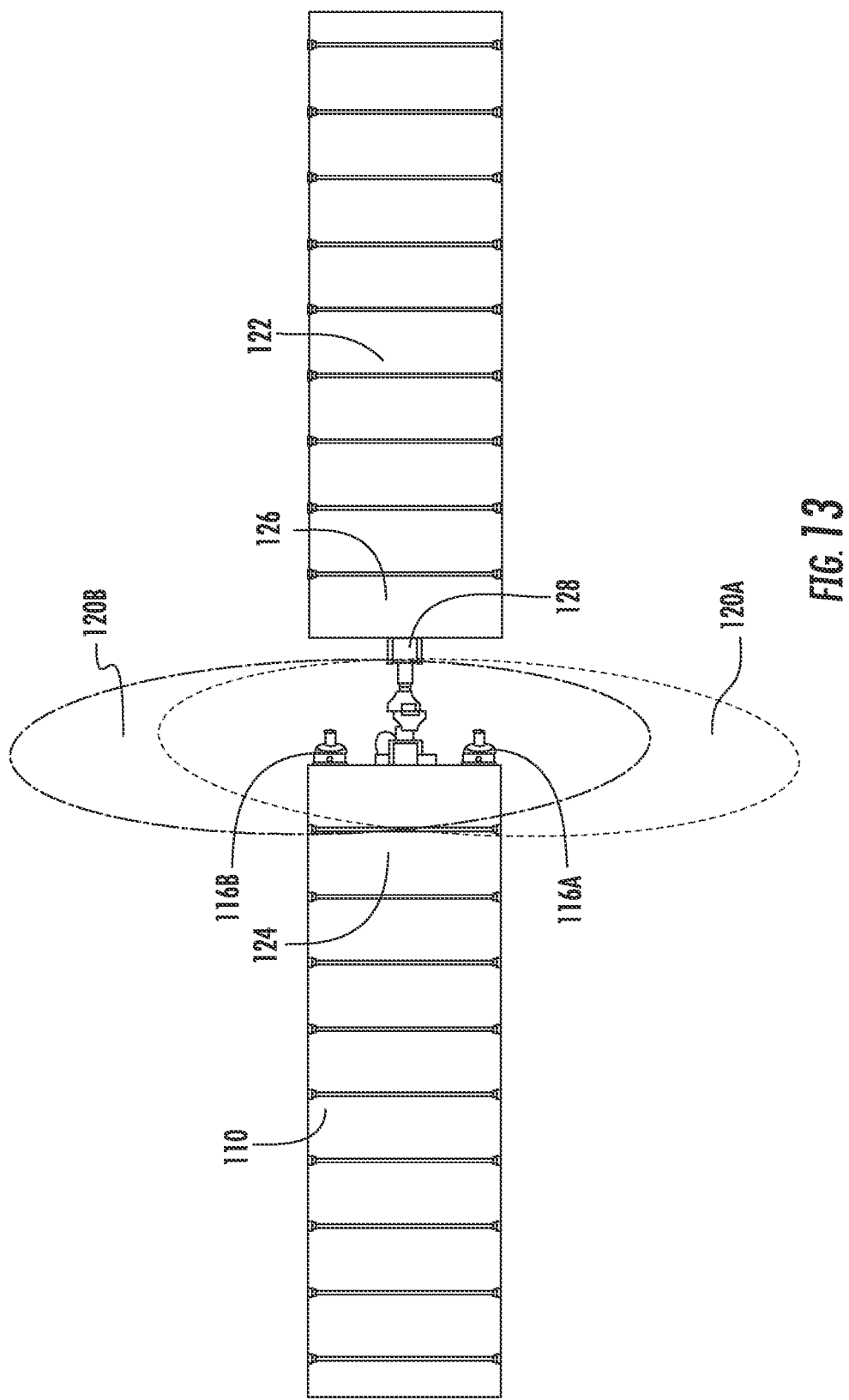

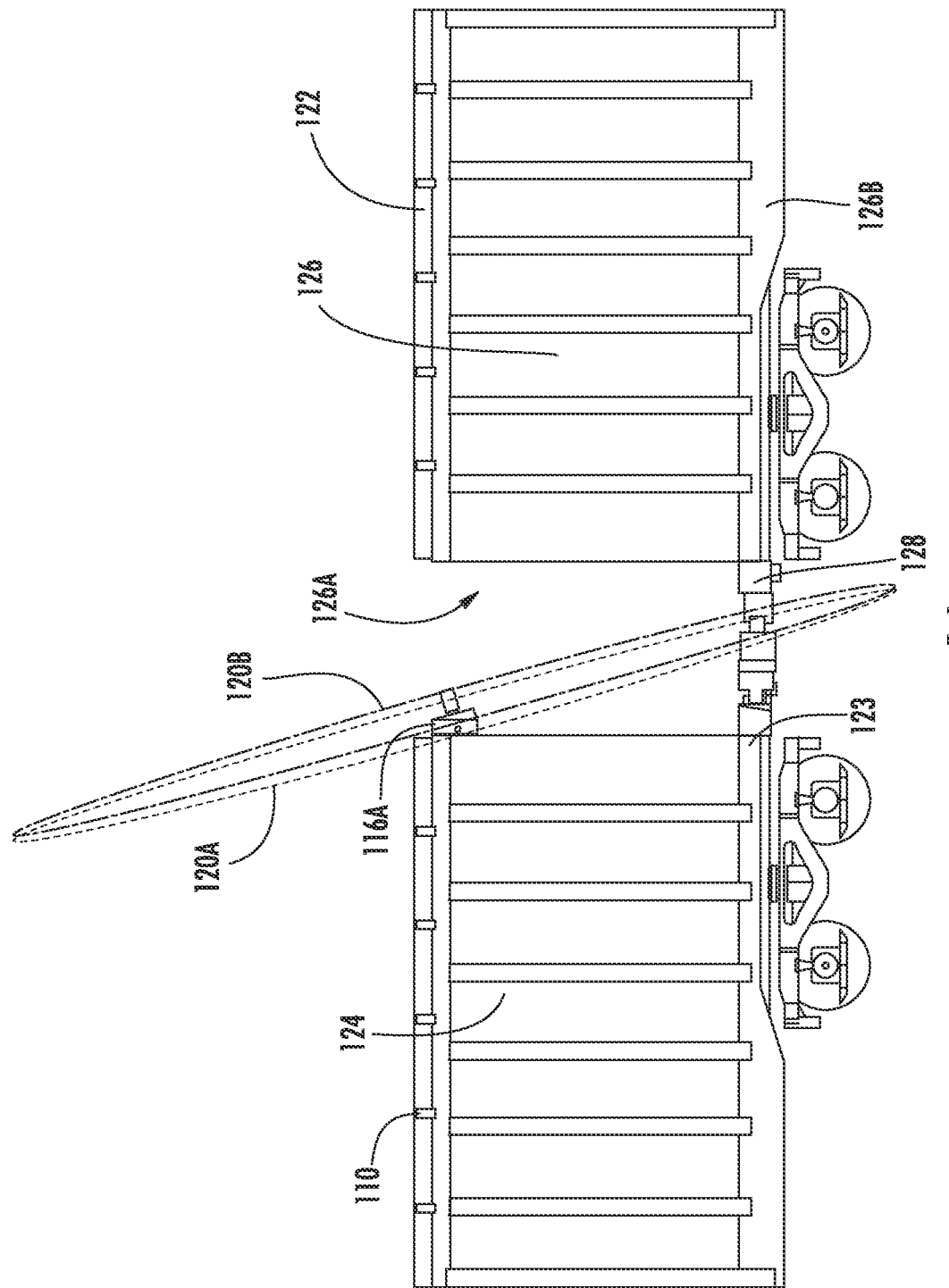

SYSTEM AND METHOD FOR GENERATING AND INTERPRETING POINT CLOUDS OF A RAIL CORRIDOR ALONG A SURVEY PATH

CROSS-REFERENCE(S) TO RELATED APPLICATION(S)

This application is a nonprovisional application claiming priority to (1) provisional U.S. Provisional Patent Application No. 62/848,630 invented by Darel Mesher and entitled "Autonomous Track Assessment System" which was filed on May 16, 2019; provisional U.S. Provisional Patent Application No. 62/988,630 invented by Darel Mesher and entitled "Autonomous Track Assessment System" which was filed on Mar. 12, 2020; and provisional U.S. Provisional Patent Application No. 63/016,661 invented by Darel Mesher and entitled "Autonomous Track Assessment System" which was filed on Apr. 28, 2020, the entireties of which are incorporated herein by reference.

FIELD

This disclosure relates to the field of automated railroad assessment systems. More particularly, this disclosure relates to a system and method for generating point clouds of a rail corridor along a survey path of a test vehicle.

BACKGROUND

In the last decade, light detection and ranging or "LiDAR" technology has been used in the railroad assessment industry to acquire 3D laser scans of the surroundings of a rail corridor. For example, PCT Publication Number WO2018/208153 entitled "System and Method for Mapping a Railway Track" to Fugro Technologies B.V. describes the use of a 3D laser scanner mounted on the front of a locomotive to gather and generate geo-referenced 3D point cloud data which includes point data corresponding to the two rails on which the vehicle is moving as well as the surroundings of the railroad track. In order to gain a broad view for the LiDAR equipment, such equipment is placed on the very front of a train on the locomotive.

A similar system for gathering 3D data using a device on the front of a locomotive is described in U.S. Patent Application Publication Number 2018/0370552 entitled "Real Time Machine Vision System for Vehicle Control and Protection" to Solfice Research, Inc. The system described can gather point cloud data including data gathered using LiDAR.

U.S. Patent Application Publication Number 2019/0135315 entitled "Railway Asset Tracking and Mapping System" to Herzog Technologies, Inc. describes the use of a LiDAR system for gathering and storing the positions and imagery of physical railroad assets along a rail corridor. Unlike the previously described systems, the Herzog system is mounted on a hi-rail vehicle which can be disruptive to normal train traffic along a railroad.

U.S. Pat. No. 9,175,998 entitled "Ballast Delivery and Computation System and Method" to Georgetown Rail Equipment Company describes a system mounted on a hi-rail vehicle using LiDAR to determine ballast profiles and whether ballast needs to be replaced.

All of the examples discussed above are either mounted on the front of a locomotive or on a hi-rail vehicle. In the former examples, the system is necessarily attached to a locomotive. In the latter examples, hi-rail vehicles are used which can be disruptive to railroads causing downtime while the hi-rail vehicle is operating.

What is needed, therefore, is an alternative to the different ways LiDAR has been used in the past to gather data related to railroads and their surroundings.

SUMMARY

The above and other needs are met by a system for generating and interpreting point clouds of a rail corridor along a survey path while moving on a railroad corridor assessment platform. In one embodiment, the system includes a railroad corridor assessment platform; a first LiDAR sensor configured to scan along a first scan plane, the first LiDAR sensor attached to the railroad corridor assessment platform in a rear-facing direction; a second LiDAR sensor configured to scan along a second scan plane, the second LiDAR sensor attached to the railroad corridor assessment platform in a rear-facing direction, wherein the first scan plane crosses the second scan plane but is not coplanar at all points with the second scan plane and wherein neither the first scan plane nor the second scan plane intersect a main body of any rail car adjoined to a rear end of the railroad corridor assessment platform; a data storage device; an Inertial Measurement Unit (IMU); a geo-location device; and a high performance computing system in electrical communication with the first LiDAR sensor, the second LiDAR sensor, the data storage device, the IMU, and the geo-location device, the computing system comprising a high-performance processor wherein the processor controls operations of the first LiDAR sensor and the second LiDAR sensor, and wherein the processor performs a method for generating and interpreting point clouds of a rail corridor, the method comprising operations of (i) obtaining a first set of point cloud data using the first LiDAR sensor; (ii) obtaining a second set of point cloud data using the second LiDAR sensor; (iii) obtaining railroad corridor assessment platform attitude information using the IMU; (iv) obtaining geo-location information using the geo-location device; (v) combining the first set of point cloud data together, the second set of point cloud data, the railroad corridor platform attitude information, and the geo-location information to generate a combined point cloud; (vi) identifying rail corridor features of interest found in the combined point cloud; (vii) creating an inventory of the identified rail corridor features of interest; and (viii) storing the combined point cloud on the data storage device.

The system for generating and interpreting point clouds of a rail corridor described above preferably further includes (A) a first sensor enclosure further including (i) a first sensor enclosure outer shell comprising a first sensor enclosure outer shell first aperture and a first sensor enclosure outer shell second aperture; (ii) a first sensor enclosure first high resolution camera in electrical communication with the computing system, the first sensor enclosure first high resolution camera oriented to view from the inside of the first sensor enclosure through the first sensor enclosure outer shell first aperture to gather digital image data of a rail corridor; and (ii) a first sensor enclosure second high resolution camera in electrical communication with the computing system, the first sensor enclosure second high resolution camera oriented to view from the inside of the first sensor enclosure through the first sensor enclosure outer shell second aperture to gather digital image data of a rail corridor; and (B) a second sensor enclosure including (i) a second sensor enclosure outer shell comprising a second sensor enclosure outer shell first aperture and a second sensor outer shell second aperture; (ii) a second sensor enclosure first high resolution camera in electrical communication with the computing system, the second sensor enclosure first high resolution camera oriented to view from the inside of the second sensor enclosure through the second sensor enclosure outer shell first aperture to gather digital image data of a rail corridor; and (iii) a second sensor enclosure second high resolution camera in electrical communication with the computing system, the second sensor enclosure second high resolution camera oriented to view from the inside of the second sensor enclosure through the second sensor enclosure outer shell second aperture to gather digital image data of a rail corridor. The system for generating and interpreting point clouds of a rail corridor may further include (A) a wheel mounted shaft encoder for sending trigger signals to the first sensor enclosure first high resolution camera, the first sensor enclosure second high resolution camera, the second sensor enclosure first high resolution camera, and the second sensor enclosure second high resolution camera as the railroad corridor assessment platform moves along a survey path; (B) the high-performance processor wherein the processor controls operations of the first sensor enclosure first high resolution camera, the first sensor enclosure second high resolution camera, the second sensor enclosure first high resolution camera, and the second sensor enclosure second high resolution camera, and wherein the processor performs a method for generating and interpreting digital image data, the method comprising operations of (i) receiving pulses from the shaft encoder and triggering the first sensor enclosure first high resolution camera, the first sensor enclosure second high resolution camera, the second sensor enclosure first high resolution camera, and the second sensor enclosure second high resolution camera to obtain digital image data at the same time instances; (ii) obtaining a first set of digital image data using the first sensor enclosure first high resolution camera; (iii) obtaining a second set of digital image data using the first sensor enclosure second high resolution camera; (iv) obtaining a third set of digital image data using the second sensor enclosure first high resolution camera; (v) obtaining a fourth set of digital image data using the second sensor enclosure second high resolution camera; (vi) combining the first set of digital image data, the second set of digital image data, the third set of digital image data, and the fourth set of digital image data to form a combined set of digital image data comprising a plurality of digital images and generating a combined panoramic digital image of the rail corridor; and (vii) storing the combined set of digital image data on the data storage device. Alternatively or additionally, the system for generating and interpreting point clouds of a rail corridor may further include (A) the first sensor enclosure further including (i) a first sensor enclosure inner shell comprising a first sensor enclosure inner shell first aperture and a first sensor enclosure inner shell second aperture, wherein the first sensor enclosure inner shell is configured to move relative to the first sensor enclosure outer shell from a first sensor enclosure inner shell open position wherein the first sensor enclosure outer shell first aperture is in line with the first sensor enclosure inner shell first aperture and the first sensor enclosure outer shell second aperture is in line with the first sensor enclosure inner shell second aperture to a first sensor enclosure inner shell closed position wherein the first sensor enclosure outer shell first aperture is not in line with the first sensor enclosure inner shell first aperture and the first sensor enclosure outer shell second aperture is not in line with the first sensor enclosure inner shell second aperture resulting in (1) the first sensor enclosure outer shell first aperture being blocked by the first sensor enclosure inner shell to protect the first sensor enclosure first high resolution camera and (2) the first sensor enclosure outer shell second aperture being blocked by the first sensor enclosure inner shell to protect the first sensor enclosure second high resolution camera; (ii) a first inner shell motorized linear actuator in electrical communication with the computing system and connected to the first sensor enclosure inner shell for moving the first sensor enclosure inner shell from the first sensor enclosure inner shell open position to the first sensor enclosure inner shell closed position or from the first sensor enclosure inner shell closed position to the first sensor enclosure inner shell open position depending upon control instructions from the computing system; (iii) a first sensor enclosure LiDAR cap configured to move from a first sensor enclosure cap open position in which the first LiDAR sensor is exposed to a first sensor enclosure cap closed position in which the first LiDAR sensor is not exposed, and from the first sensor enclosure cap closed position to the first sensor enclosure cap open position; and (iv) a first LiDAR cap motorized actuator in electrical communication with the computing system and connected to the first sensor enclosure LiDAR cap for moving the first sensor enclosure LiDAR cap from the first sensor enclosure cap closed position to the first sensor enclosure cap open position or from the first sensor enclosure cap open position to the first sensor enclosure cap closed position depending on control instructions from the computing system; and (B) the second sensor enclosure further including (i) a second sensor enclosure inner shell comprising a second sensor enclosure inner shell first aperture and a second sensor enclosure inner shell second aperture, wherein the second sensor enclosure inner shell is configured to move relative to the second sensor enclosure outer shell from a second sensor enclosure inner shell open position wherein the second sensor enclosure outer shell first aperture is in line with the second sensor enclosure inner shell first aperture and the second sensor enclosure outer shell second aperture is in line with the second sensor enclosure inner shell second aperture to a second sensor enclosure inner shell closed position wherein the second sensor enclosure outer shell first aperture is not in line with the second sensor enclosure inner shell first aperture and the second sensor enclosure outer shell second aperture is not in line with the second sensor enclosure inner shell second aperture resulting in (1) the second sensor enclosure outer shell first aperture being blocked by the second sensor enclosure inner shell to protect the second sensor enclosure first high resolution camera and (2) the second sensor enclosure outer shell second aperture being blocked by the second sensor enclosure inner shell to protect the second sensor enclosure second high resolution camera; (ii) a second inner shell motorized linear actuator in electrical communication with the computing system and connected to the second sensor enclosure inner shell for moving the second sensor enclosure inner shell from the second sensor enclosure inner shell open position to the second sensor enclosure inner shell closed position or from the second sensor enclosure inner shell closed position to the second sensor enclosure inner shell open position depending upon control instructions from the computing system; (iii) a second sensor enclosure LiDAR cap configured to move from a second sensor enclosure cap open position in which the second LiDAR sensor is exposed to a second sensor enclosure cap closed position in which the second LiDAR sensor is not exposed, and from the second sensor enclosure cap closed position to the second sensor enclosure cap open position; and (iV) a second LiDAR cap motorized actuator in electrical communication with the computing system and connected to the second sensor enclosure LiDAR cap for moving the second sensor enclosure LiDAR cap from the second sensor enclosure cap closed position to the second sensor enclosure cap open position or from the second sensor enclosure cap open position to the second sensor enclosure cap closed position depending on control instructions from the computing system.

Some versions of the system described above may further include (A) a climatic sensor on the railroad corridor assessment platform, the climatic sensor in electrical communication with the computing system; and (B) the high-performance processor wherein the processor controls operations of the first inner shell motorized linear actuator and the second inner shell motorized linear actuator, and wherein the processor performs a method for protecting the first sensor enclosure first high resolution camera, the first sensor enclosure second high resolution camera, the second sensor enclosure first high resolution camera, and the second sensor enclosure second high resolution camera, the method comprising operations of (i) receiving climatic conditions data from the climatic sensor; (ii) activating the first inner shell motorized linear actuator to move the first sensor enclosure inner shell from the first sensor enclosure inner shell open position to the first sensor enclosure inner shell closed position based on the received climatic conditions data; (iii) activating the second inner shell motorized linear actuator to move the second sensor enclosure inner shell from the second sensor enclosure inner shell open position to the second sensor enclosure inner shell closed position based on the received climatic conditions data; (iv) activating the first LiDAR cap motorized actuator to move the first sensor enclosure LiDAR cap from the first sensor enclosure cap open position to the first sensor enclosure cap closed position; and (v) activating the second LiDAR cap motorized actuator to move the second sensor enclosure LiDAR cap from the second sensor enclosure cap open position to the second sensor enclosure cap closed position.

Some versions of the system described above may further include (A) a motion sensor for sensing motion of the railroad corridor assessment platform, the motion sensor in electrical communication with the computing system; and (B) the high-performance processor wherein the processor controls operations of the first inner shell motorized linear actuator and the second inner shell motorized linear actuator, and wherein the processor performs a method for protecting the first sensor enclosure first high resolution camera, the first sensor enclosure second high resolution camera, the second sensor enclosure first high resolution camera, and the second sensor enclosure second high resolution camera, the method comprising operations of (i) receiving a motion sensor signal from the motion sensor indicating that the railroad corridor assessment platform is moving relative to a railroad track below a minimum speed threshold programmed into the computing system; (ii) activating the first inner shell motorized linear actuator to move the first sensor enclosure inner shell from the first sensor enclosure inner shell open position to the first sensor enclosure inner shell closed position based on the received motion sensor signal; (iii) activating the second inner shell motorized linear actuator to move the second sensor enclosure inner shell from the second sensor enclosure inner shell open position to the second sensor enclosure inner shell closed position based on the received motion sensor signal; (iv) activating the first LiDAR cap motorized actuator to move the first sensor enclosure LiDAR cap from the first sensor enclosure cap open position to the first sensor enclosure cap closed position; and (v) activating the second LiDAR cap motorized actuator to move the second sensor enclosure LiDAR cap from the second sensor enclosure cap open position to the second sensor enclosure cap closed position.

Some versions of the system described above may further include (A) a temperature sensor on the railroad corridor assessment platform in electrical communication with the computing system and proximate to the first sensor enclosure and the second sensor enclosure; (B) a heating and cooling system in electrical communication with the computing system, the heating and cooling system further including (i) an air blower; (ii) a heater for heating air blown from the air blower; (iii) an air chiller for cooling air blown from the air blower; and (iv) an air duct for channeling air from the air blower to the first sensor enclosure and the second sensor enclosure; and (C) the high-performance processor wherein the processor controls operations of the heating and cooling system, and wherein the processor performs a method for regulating air temperature in the first sensor enclosure and the second sensor enclosure, the method comprising operations of (i) receiving temperature data from the temperature sensor; (ii) activating the air blower; and (iii) activating the heater or the air chiller based on the received temperature data.

Some versions of the system described above may further include (A) the first sensor enclosure further comprising at least one first sensor air aperture through which air can directed across the first LiDAR sensor; and (B) the second sensor enclosure further comprising at least one second sensor air aperture through which air can directed across the second LiDAR sensor.

Some versions of the system described above may further include (A) a first sensor enclosure in which the first LiDAR sensor is housed; (B) a second sensor enclosure in which the second LiDAR sensor is housed; (C) a temperature sensor in electrical communication with the computing system and located proximate to the first LiDAR sensor and the second LiDAR sensor; (D) a heating and cooling system in electrical communication with the computing system, the heating and cooling system further including (i) an air blower; (ii) a heater for heating air blown from the air blower; (iii) an air chiller for cooling air blown from the air blower; and (iv) a duct for channeling air from the air blower to the first sensor enclosure and the second sensor enclosure depending on temperature data sent by the temperature sensor to the computing system.

In another aspect, a method for generating and interpreting point clouds of a rail corridor is disclosed. In one embodiment, the method includes (A) obtaining a first set of point cloud data using a processor and a first LiDAR sensor oriented to scan along a first scan plane and attached to a railroad corridor assessment platform in a rear-facing orientation wherein the first LiDAR sensor is in electrical communication with the processor; (B) obtaining a second set of point cloud data using the processor and a second LiDAR sensor oriented to scan along a second scan plane and attached to the railroad corridor assessment platform in a rear-facing orientation wherein the second LiDAR sensor is in electrical communication with the processor, wherein the first scan plane crosses the second scan plane but is not coplanar at all points with the second scan plane, and wherein neither the first scan plane nor the second scan plane intersect a main body of any rail car adjoined to a rear end of the railroad corridor assessment platform; (C) obtaining railroad corridor assessment platform attitude data using an Inertial Measurement Unit (IMU) in electrical communication with the processor; (D) obtaining geo-location data of the railroad corridor assessment platform using a geo-location device in electrical communication with the processor; (E) combining the first set of point cloud data, the second set of point cloud data, the railroad corridor assessment platform attitude data, and the geo-location data to generate a combined point cloud using the processor; (F) identifying rail corridor features of interest found in the combined point cloud using the processor; (G) creating an inventory of the identified rail corridor features of interest using the processor; and (H) storing the combined point cloud on a data storage device in electrical communication with the processor. In some embodiments, the method may further include (A) receiving pulses from a wheel mounted shaft encoder in electrical communication with the processor and triggering a first sensor enclosure first high resolution camera, a first sensor enclosure second high resolution camera, a second sensor enclosure first high resolution camera, and a second sensor enclosure second high resolution camera to obtain digital image data at the same time instances; (B) obtaining a first set of digital image data using the first sensor enclosure first high resolution camera; (C) obtaining a second set of digital image data using the first sensor enclosure second high resolution camera; (D) obtaining a third set of digital image data using the second sensor enclosure first high resolution camera; (E) obtaining a fourth set of digital image data using the second sensor enclosure second high resolution camera; (F) combining the first set of digital image data, the second set of digital image data, the third set of digital image data, and the fourth set of digital image data to form a combined set of digital image data comprising a plurality of digital images and generating a combined panoramic digital image of a rail corridor; and (G) storing the combined set of digital image data on a data storage device in electrical communication with the processor. Such methods may further include colorizing the combined point cloud using the combined set of digital image data and the processor.

Some versions of the method described above may further include (A) triggering a first sensor enclosure third high resolution camera and a second sensor enclosure third high resolution camera to obtain digital image data at the same time instances as the first sensor enclosure first high resolution camera, the first sensor enclosure second high resolution camera, the second sensor enclosure first high resolution camera, and the second sensor enclosure second high resolution camera; (B) obtaining a fifth set of digital image data using a first sensor enclosure third high resolution camera; (C) obtaining a sixth set of digital image data using a second sensor enclosure third high resolution camera; and (D) combining the first set of digital image data, the second set of digital image data, the third set of digital image data, the fourth set of digital image data, the fifth set of digital image data and the sixth set of digital image data to form a combined set of digital image data comprising a plurality of digital images and generating a combined panoramic digital image of a rail corridor. Such methods may further include geo-referencing the colorized combined point cloud using a geo-referencing device.

Some versions of the methods described above may further include (A) housing the first LiDAR sensor, the first sensor enclosure first high resolution camera, the first sensor enclosure second high resolution camera, and the first sensor enclosure third high resolution camera in a first sensor enclosure including a first sensor enclosure LiDAR cap for protecting the first LiDAR sensor; (B) housing the second LiDAR sensor, the second sensor enclosure first high resolution camera, the second sensor enclosure second high resolution camera, and the second sensor enclosure third high resolution camera in a second sensor enclosure including a second sensor enclosure LiDAR cap for protecting the second LiDAR sensor; and (C) blowing temperature-controlled air to the first sensor enclosure and the second sensor enclosure using a heating and cooling system including an air blower wherein temperature-controlled air is blown through an air duct to the first sensor enclosure and the second sensor enclosure and wherein the heating and cooling system is controlled by the computing system based on temperature data received by a temperature sensor proximate to the first LiDAR sensor and the second LiDAR sensor.

Some versions of the methods described above may further include (A) blowing temperature-controlled air through an aperture in the first sensor enclosure adjacent to the first LiDAR sensor for blowing away flying debris and precipitation from the first LiDAR sensor and to maintain the first sensor enclosure LiDAR cap at a temperature above freezing to eliminate the accumulation of frozen precipitation; and (B) blowing temperature-controlled air through an aperture in the second sensor enclosure adjacent to the second LiDAR sensor for blowing away flying debris and precipitation from the second LiDAR sensor and to maintain the second sensor enclosure LiDAR cap at a temperature above freezing to eliminate the accumulation of frozen precipitation Some versions of the methods described above may further include (A) housing the first LiDAR sensor in a first sensor enclosure including (i) a first sensor enclosure LiDAR cap configured to move from a first sensor enclosure cap open position in which the first LiDAR sensor is exposed to a first sensor enclosure cap closed position in which the first LiDAR sensor is not exposed, and from the first sensor enclosure cap closed position to the first sensor enclosure cap open position; and (ii) a first LiDAR cap motorized linear actuator in electrical communication with the computing system and connected to the first sensor enclosure LiDAR cap for moving the first sensor enclosure LiDAR cap from the first sensor enclosure cap closed position to the first sensor enclosure cap open position or from the first sensor enclosure cap open position to the first sensor enclosure cap closed position depending on control instructions from the computing system; (B) housing the first sensor enclosure first high-resolution camera in the first sensor enclosure including (i) a first sensor enclosure outer shell; (ii) a first sensor enclosure outer shell first aperture through which the first sensor enclosure first high-resolution camera obtains digital image data; (ii) a first sensor enclosure inner shell configured to move relative to the first sensor outer shell from a first sensor enclosure inner shell open position wherein the first sensor enclosure outer shell first aperture is open and the first sensor enclosure first high-resolution camera is exposed to weather outside the first sensor enclosure to a first sensor enclosure inner shell closed position wherein the first sensor enclosure outer shell first aperture is blocked by the first sensor inner shell and the first sensor enclosure first high-resolution camera is not exposed to weather outside the first sensor enclosure; (C) housing the first sensor enclosure second high-resolution camera in the first sensor enclosure including (i) a first sensor enclosure outer shell second aperture through which the first sensor enclosure second high-resolution camera obtains digital image data; (ii) the first sensor enclosure inner shell configured to move relative to the first sensor enclosure outer shell from the first sensor enclosure inner shell open position wherein the first sensor enclosure outer shell second aperture is open and the first sensor enclosure second high-resolution camera is exposed to weather outside the first sensor enclosure to the first sensor enclosure inner shell closed position wherein the first sensor enclosure outer shell second aperture is blocked by the first sensor inner shell and the first sensor enclosure second high-resolution camera is not exposed to weather outside the first sensor enclosure; (iii) a first inner shell motorized linear actuator connected to the first sensor enclosure inner shell and in electrical communication with the processor for moving the first sensor enclosure inner shell from the first sensor enclosure inner shell open position to the first sensor enclosure inner shell closed position and from the first sensor enclosure inner shell closed position to the first sensor enclosure inner shell open position depending on instructions from the processor; (D) housing the second LiDAR sensor in a second sensor enclosure including (i) a second sensor enclosure LiDAR cap configured to move from a second sensor enclosure cap open position in which the second LiDAR sensor is exposed to a second sensor enclosure cap closed position in which the second LiDAR sensor is not exposed, and from the second sensor enclosure cap closed position to the second sensor enclosure cap open position; and (ii) a second LiDAR cap motorized linear actuator in electrical communication with the computing system and connected to the second sensor enclosure LiDAR cap for moving the second sensor enclosure LiDAR cap from the second sensor enclosure cap closed position to the second sensor enclosure cap open position or from the second sensor enclosure cap open position to the second sensor enclosure cap closed position depending on control instructions from the computing system; (E) housing the second sensor enclosure first high-resolution camera in the second sensor enclosure including (i) a second sensor enclosure outer shell; (ii) a second sensor enclosure outer shell first aperture through which the second sensor enclosure first high-resolution camera obtains digital image data; (iii) a second sensor enclosure inner shell configured to move relative to the second sensor outer shell from a second sensor enclosure inner shell open position wherein the second sensor enclosure outer shell first aperture is open and the second sensor enclosure first high-resolution camera is exposed to weather outside the second sensor enclosure to a second sensor inner shell closed position wherein the second sensor enclosure outer shell first aperture is blocked by the second sensor inner shell and the second sensor enclosure first high-resolution camera is not exposed to weather outside the second sensor enclosure; and (F) housing the second sensor enclosure second high-resolution camera in the second sensor enclosure including (i) a second sensor enclosure outer shell second aperture through which the second sensor enclosure second high-resolution camera obtains digital image data; (ii) the second sensor enclosure inner shell configured to move relative to the second sensor enclosure outer shell from the second sensor enclosure inner shell open position wherein the second sensor enclosure outer shell second aperture is open and the second sensor enclosure second high-resolution camera is exposed to weather outside the second sensor enclosure to the second sensor enclosure inner shell closed position wherein the second sensor enclosure outer shell second aperture is blocked by the second sensor inner shell and the second sensor enclosure second high-resolution camera is not exposed to weather outside the second sensor enclosure; and (iii) a second inner shell motorized linear actuator connected to the second sensor enclosure inner shell and in electrical communication with the processor for moving the second sensor enclosure inner shell from the second sensor enclosure inner shell open position to the second sensor enclosure inner shell closed position and from the second sensor enclosure inner shell closed position to the second sensor enclosure inner shell open position depending on instructions from the processor;

Some versions of the methods described above may further include (A) detecting weather conditions outside the first sensor enclosure and the second sensor enclosure using a climatic sensor in electrical communication with the processor; (B) activating the first inner shell motorized linear actuator to move the first sensor enclosure inner shell from the first sensor enclosure inner shell open position to the first sensor enclosure inner shell closed position based on information received by the processor from the climatic sensor; (C) activating the second inner shell motorized linear actuator to move the second sensor enclosure inner shell from the second sensor enclosure inner shell open position to the second sensor enclosure inner shell closed position based on information received by the processor from the climatic sensor; (D) activating the first LiDAR cap motorized linear actuator to move the first sensor enclosure LiDAR cap from the first sensor enclosure cap open position to the first sensor enclosure cap closed position; and (E) activating the second LiDAR cap motorized linear actuator to move the second sensor enclosure LiDAR cap from the second sensor enclosure cap open position to the second sensor enclosure cap closed position.

Some versions of the methods described above may further include (A) detecting movement of the railroad corridor assessment platform using a motion sensor; (B) activating the first inner shell motorized linear actuator to move the first sensor enclosure inner shell from the first sensor enclosure inner shell open position to the first sensor enclosure inner shell closed position based on information received by the processor from the motion sensor; (C) activating the second inner shell motorized linear actuator to move the second sensor enclosure inner shell from the second sensor enclosure inner shell open position to the second sensor enclosure inner shell closed position based on information received by the processor from the motion sensor; (D) activating the first LiDAR cap motorized actuator to move the first sensor enclosure LiDAR cap from the first sensor enclosure cap open position to the first sensor enclosure cap closed position; and (E) activating the second LiDAR cap motorized actuator to move the second sensor enclosure LiDAR cap from the second sensor enclosure cap open position to the second sensor enclosure cap closed position.

In another aspect, a system for generating and interpreting point clouds of a rail corridor along a survey path while moving on a railroad corridor assessment platform is disclosed. In some embodiments, the system includes (A) a railroad corridor assessment platform; (B) a first LiDAR sensor configured to scan along a first scan plane, the first LiDAR sensor attached to the railroad corridor assessment platform in a rear-facing direction; (C) a second LiDAR sensor configured to scan along a second scan plane, the second LiDAR sensor attached to the railroad corridor assessment platform in a rear-facing direction, wherein the first scan plane crosses the second scan plane but is not coplanar at all points with the second scan plane and wherein neither the first scan plane nor the second scan plane intersect a main body of any rail car adjoined to a rear end of the railroad corridor assessment platform; (D) a data storage device; (E) an Inertial Measurement Unit (IMU); (F) a geo-location device; and (G) a high performance computing system in electrical communication with the first LiDAR sensor, the second LiDAR sensor, the data storage device, the IMU, and the geo-location device, the computing system comprising a high-performance processor wherein the processor controls operations of the first LiDAR sensor and the second LiDAR sensor for obtaining and storing point cloud data.

Some versions of the methods described above may further include (A) a first sensor enclosure in which the first LiDAR sensor is housed; (B) a second sensor enclosure in which the second LiDAR sensor is housed; (C) a temperature sensor in electrical communication with the computing system and located proximate to the first LiDAR sensor and the second LiDAR sensor; (D) a heating and cooling system in electrical communication with and controlled by the computing system, the heating and cooling system further including (i) an air blower; (ii) a heater for heating air blown from the air blower; (iii) an air chiller for cooling air blown from the air blower; and (iv) a duct for channeling air from the air blower to the first sensor enclosure and the second sensor enclosure depending on temperature data sent by the temperature sensor to the computing system.

Some versions of the methods described above may further include (A) the first sensor enclosure further including (i) a first sensor enclosure inner shell comprising a first sensor enclosure inner shell first aperture and a first sensor enclosure inner shell second aperture, wherein the first sensor enclosure inner shell is configured to move relative to the first sensor enclosure outer shell from a first sensor enclosure inner shell open position wherein the first sensor enclosure outer shell first aperture is in line with the first sensor enclosure inner shell first aperture and the first sensor enclosure outer shell second aperture is in line with the first sensor enclosure inner shell second aperture to a first sensor enclosure inner shell closed position wherein the first sensor enclosure outer shell first aperture is not in line with the first sensor enclosure inner shell first aperture and the first sensor enclosure outer shell second aperture is not in line with the first sensor enclosure inner shell second aperture resulting in (1) the first sensor enclosure outer shell first aperture being blocked by the first sensor enclosure inner shell to protect the first sensor enclosure first high resolution camera and (2) the first sensor enclosure outer shell second aperture being blocked by the first sensor enclosure inner shell to protect the first sensor enclosure second high resolution camera; and (ii) a first inner shell motorized linear actuator in electrical communication with the computing system and connected to the first sensor enclosure inner shell for moving the first sensor enclosure inner shell from the first sensor enclosure inner shell open position to the first sensor enclosure inner shell closed position and from the first sensor enclosure inner shell closed position to the first sensor enclosure inner shell open position depending upon control instructions from the computing system; (iii) a first sensor enclosure LiDAR cap configured to move from a first sensor enclosure cap open position in which the first LiDAR sensor is exposed to a first sensor enclosure cap closed position in which the first LiDAR sensor is not exposed, and from the first sensor enclosure cap closed position to the first sensor enclosure cap open position; and (iv) a first LiDAR cap motorized actuator in electrical communication with the computing system and connected to the first sensor enclosure LiDAR cap for moving the first sensor enclosure LiDAR cap from the first sensor enclosure cap closed position to the first sensor enclosure cap open position or from the first sensor enclosure cap open position to the first sensor enclosure cap closed position depending on control instructions from the computing system; and (B) the second sensor enclosure further including (i) a second sensor enclosure inner shell comprising a second sensor enclosure inner shell first aperture and a second sensor enclosure inner shell second aperture, wherein the second sensor enclosure inner shell is configured to move relative to the second sensor enclosure outer shell from a second sensor enclosure inner shell open position wherein the second sensor enclosure outer shell first aperture is in line with the second sensor enclosure inner shell first aperture and the second sensor enclosure outer shell second aperture is in line with the second sensor enclosure inner shell second aperture to a second sensor enclosure inner shell closed position wherein the second sensor enclosure outer shell first aperture is not in line with the second sensor enclosure inner shell first aperture and the second sensor enclosure outer shell second aperture is not in line with the second sensor enclosure inner shell second aperture resulting in (1) the second sensor enclosure outer shell first aperture being blocked by the second sensor enclosure inner shell to protect the second sensor enclosure first high resolution camera and (2) the second sensor enclosure outer shell second aperture being blocked by the second sensor enclosure inner shell to protect the second sensor enclosure second high resolution camera; (ii) a second inner shell motorized linear actuator in electrical communication with the computing system and connected to the second sensor enclosure inner shell for moving the second sensor enclosure inner shell from the second sensor enclosure inner shell open position to the second sensor enclosure inner shell closed position and from the second sensor enclosure inner shell closed position to the second sensor enclosure inner shell open position depending upon control instructions from the computing system; (iii) a second sensor enclosure LiDAR cap configured to move from a second sensor enclosure cap open position in which the second LiDAR sensor is exposed to a second sensor enclosure cap closed position in which the second LiDAR sensor is not exposed, and from the second sensor enclosure cap closed position to the second sensor enclosure cap open position; and (iv) a second LiDAR cap motorized actuator in electrical communication with the computing system and connected to the second sensor enclosure LiDAR cap for moving the second sensor enclosure LiDAR cap from the second sensor enclosure cap closed position to the second sensor enclosure cap open position or from the second sensor enclosure cap open position to the second sensor enclosure cap closed position depending on control instructions from the computing system.

Some versions of the methods described above may further include a climatic sensor in electrical communication with the computing device.

Some versions of the methods described above may further include a motion sensor for sensing motion of the railroad corridor assessment platform and wherein the motion sensor is in electrical communication with the computing system.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 2 shows a rear view of the boxcar shown in FIG. 1 including the first rear-mounted sensor enclosure including the first LiDAR sensor and a second rear-mounted sensor enclosure including a second LiDAR sensor;

FIG. 3A shows a side cross-sectional view of the first sensor enclosure shown in a first sensor enclosure inner shell open position, exposing the first LiDAR sensor so that point cloud data can be gathered by the first LiDAR sensor;

FIG. 3B shows a side cross-sectional view of the first sensor enclosure shown in a first sensor enclosure inner shell closed position, concealing and protecting the first LiDAR sensor from the elements including inclement weather;

FIG. 12A shows a first end view of the first sensor enclosure with the outer shell removed to reveal a range of preferred orientations of the first LiDAR sensor along a X,Y plane with the first LiDAR sensor being rotatable along an Z axis coming out of the page at point 180;

FIG. 12B shows a second end view of the first sensor enclosure with the outer shell removed to reveal a range of preferred orientations of the first LiDAR sensor along a X,Y plane with the first LiDAR sensor being rotatable along an Z axis coming out of the page at point 180;

FIG. 13 shows a plan view of looking down on the railroad boxcar with the first sensor enclosure and the second sensor enclosure and an adjoining railroad boxcar coupled to the railroad boxcar with the sensor enclosures wherein the view shows a preferred first scan plane of the first LiDAR sensor and a preferred second scan plane of the second LiDAR sensor wherein the scan planes intersect but are not coplanar at all points and wherein the scan planes do not intersect a main body of the adjoining rail car, thereby providing a 360-degree scan line for gathering point cloud data using the first LiDAR sensor and the second LiDAR sensor; and FIG. 14 shows a side view of looking at the railroad boxcar with the first sensor enclosure and the second sensor enclosure and an adjoining railroad boxcar coupled to the to railroad boxcar with the sensor enclosures as shown in FIG. 13 wherein the view shows a preferred first scan plane of the first LiDAR sensor and a preferred second scan plane of the second LiDAR sensor wherein the scan planes intersect but are not coplanar at all points and wherein the scan planes do not intersect a main body of the adjoining rail car, thereby providing a 360-degree scan line for gathering point cloud data using the first LiDAR sensor and the second LiDAR sensor.

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Air or Gas: broadly defined as any gas or mixtures thereof

Data Communication: a first feature is said to be in data communication with a second feature if the first feature is configured to transmit information to the second feature and the second feature is configured to receive such data, whether such data is transmitted through one or more electrical conductors (e.g., wires), cables (including optical fiber), wirelessly, or a combination thereof.

Electrical Communication: a first feature is said to be in electrical communication with a second feature if there is a conductive path for electricity in any form to flow between the first feature and the second feature thereby electrically connecting the first feature with the second feature. Being in electrical communication does not necessarily mean that electricity is actively flowing but that such structures are configured so that electricity could flow easily from the first feature to the second feature. Features that are in electrical communication may also be in data communication with one another. Therefore, for features that normally transfer or receive data, if such features are said to be in electrical communication with one another, it can be inferred that such features are also in data communication with one another.

Fluid Communication: a first feature is said to be in fluid communication with a second feature if there is a duct or path for air to flow between the first feature and the second feature.

Proximate: a first feature is said to be proximate to a second feature if the first feature is attached to or otherwise extends all the way to the second feature or if the first feature is located close to or extends to a location close to the second feature.

Figure 1:
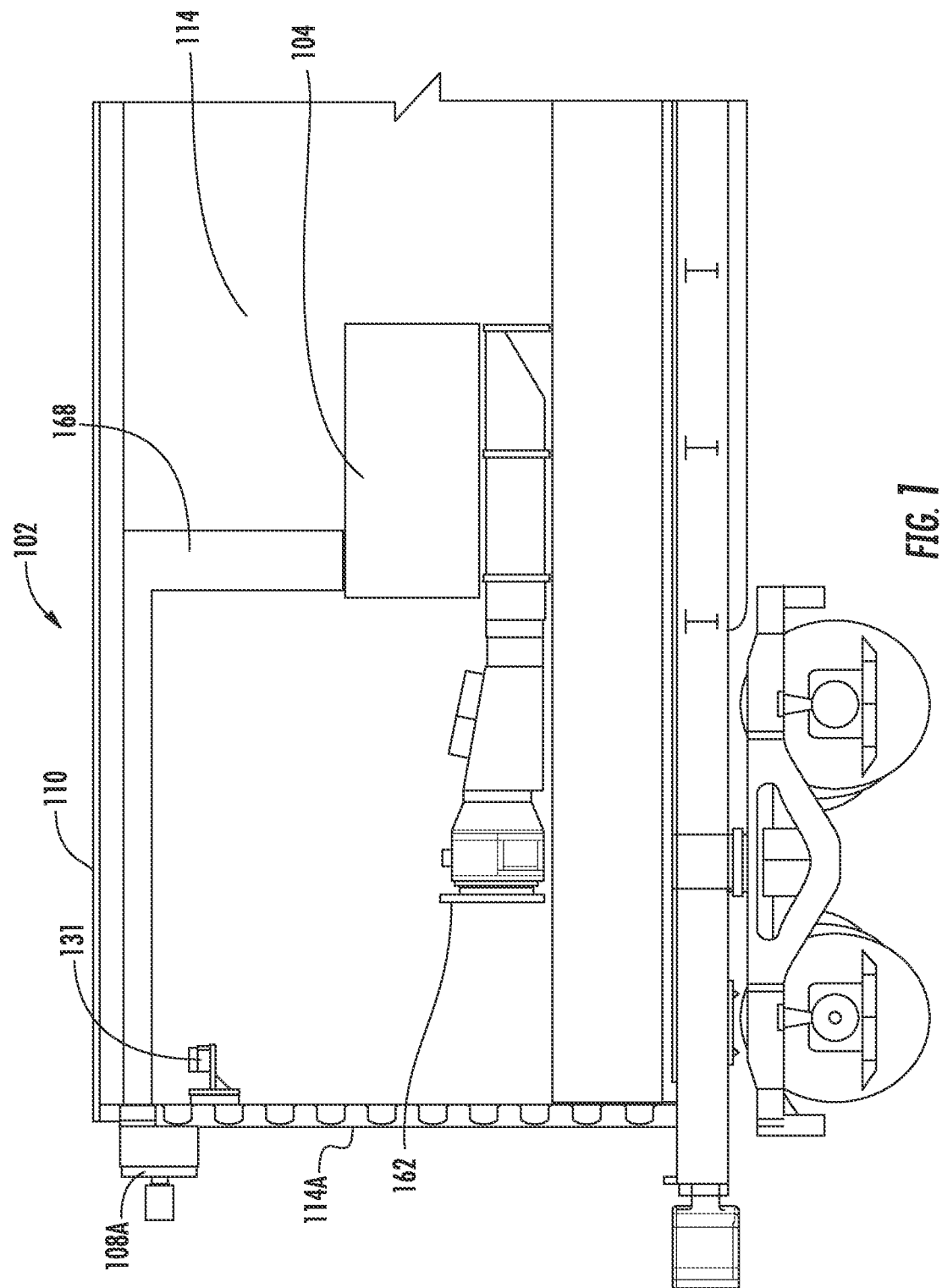
FIG. 1 shows an image of a rear section of a railroad corridor assessment platform including a boxcar showing a cross-sectional view of the railroad boxcar revealing a portion of a railroad corridor assessment system including a rear-mounted first sensor enclosure including a first LiDAR sensor.

FIGS. 1-10 show different views and aspects of a railroad corridor assessment system 100 for generating and interpreting point clouds of a rail corridor along a survey path while moving on a railroad corridor assessment platform 102. The system 100 includes a computing system 104 including a high-performance processor 106. The computing system 104 is in electrical communication with a first LiDAR sensor 108A and a second LiDAR sensor 108B as shown schematically in FIG. 10. In the embodiment shown in FIG. 1 and FIG. 2, the railroad corridor assessment platform 102 includes a railroad boxcar 110 including a roof 112 and a plurality of walls 114 including a rear wall 114A. FIG. 1 shows a cross-sectional view of the railroad boxcar 110 and some of its contents. The first LiDAR sensor 108A is housed in a first sensor enclosure 116A attached near the top of the rear wall 114A near a first side 118A of the railroad boxcar 110 as shown in FIG. 2. Similarly, the second LiDAR sensor 108B is housed in a second sensor enclosure 116B attached near the top of the rear wall 114A near a second side 118B of the railroad boxcar 110 as shown in FIG. 1 and FIG. 2.

Figure 5:
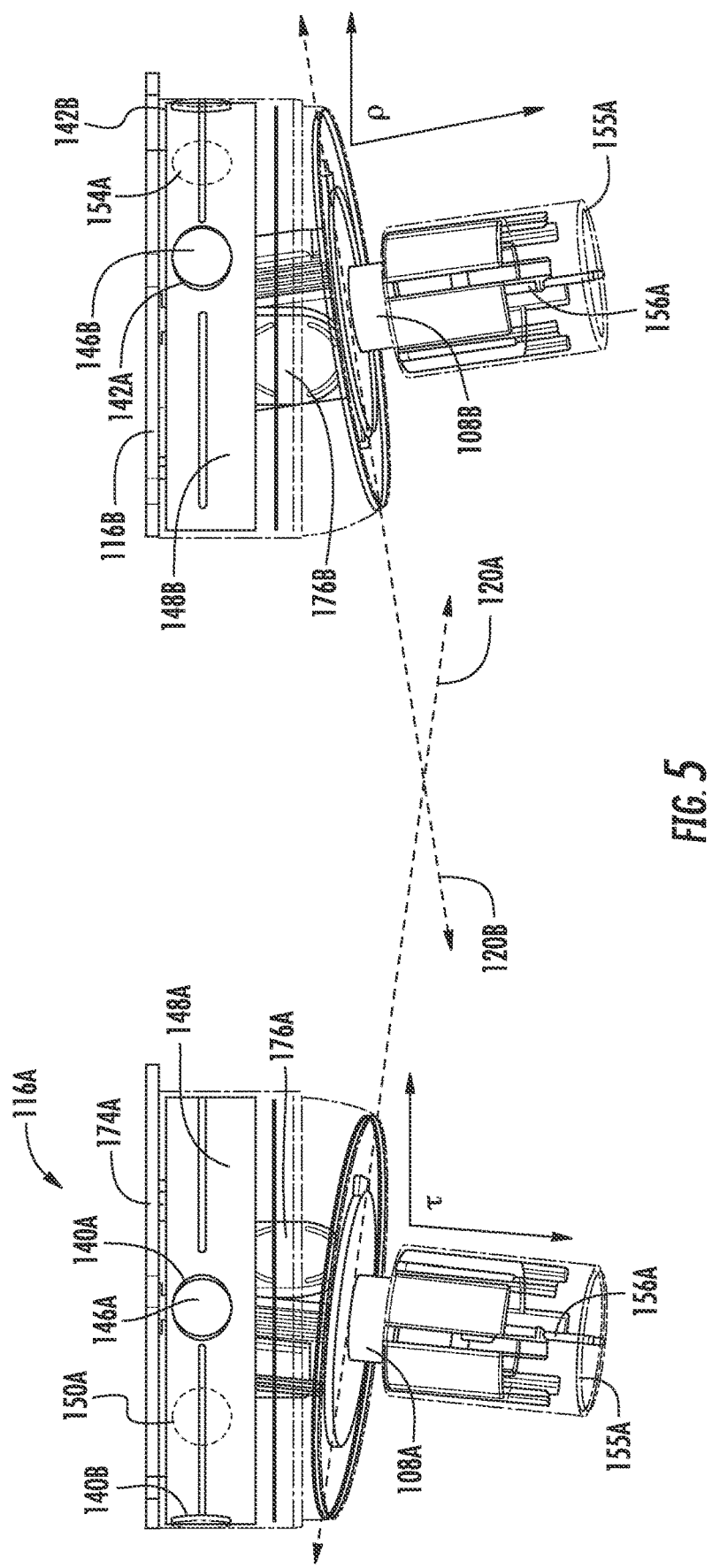
FIG. 5 shows a partially transparent plan view looking down on and into the first sensor enclosure and the second sensor enclosure as they would be mounted on the railroad boxcar wherein the first LiDAR sensor and the second LiDAR sensor are configured in preferred orientations to gather point cloud data.

An important aspect of the railroad corridor assessment system 100 is the orientation of the first LiDAR sensor 108A and the second LiDAR sensor 108B. The first LiDAR sensor 108A is oriented and configured to scan a first scan plane 120A. The second LiDAR sensor 108B is oriented and configured to scan a second scan plane 120B which, although intersecting with the first scan plane 120A is not in the same plane as the first scan plane 120A. The first scan plane 120A and the second scan plane 120B intersect as shown in FIG. 5, FIG. 13, and FIG. 14. Specific information regarding the angles of orientation are discussed in more detail below. An adjoining railroad boxcar 122 is shown coupled to a rear end 123 of the railroad boxcar 110 in FIG. 13 and FIG. 14. These figures show how the first LiDAR sensor 108A scanning along the first scan plane 120A and the second LiDAR sensor 108B scanning along the second scan plane 120B are able to acquire 360 degrees of point cloud data despite the adjoining railroad boxcar 122 being coupled so close to the railroad boxcar 110. Because of the specific orientation of the LiDAR sensors 108, the first scan plane 120A and the second scan plane 120B fit tightly between a main body 124 of the railroad boxcar 110 and a main body 126 of the adjoining railroad boxcar 122 without the first scan plane 120A or the second scan plane 120B intersecting the main body 124 of the railroad boxcar 110 or the main body of any adjoining rail car of any type such as, for example, the main body 126 of the adjoining railroad boxcar 122. As such, the visual presence from the perspective of the LiDAR sensors 108 of any railroad boxcar coupled to and behind the railroad boxcar 110 is effectively minimized when the LiDAR sensors 108 gather point cloud data. Additionally, with the selection of preferred scan planes, there is no interference between the scan planes and the adjacent box car main body even when the cars travel on curved track and the corners of one side of the box car bodies are necessarily closer. Taking the adjoining railroad boxcar 122 as an example, a "main body" of a railroad boxcar is defined herein as walls 126A (if present) and a base platform 126B including wheels and axles supporting such platform but excluding coupling hardware 128. Prior to this disclosure, similar LiDAR systems were only used on the front of locomotives or on the roofs hi-rail vehicles. A unique feature of the railroad corridor assessment system 100 is that the LiDAR sensors 108 are attached to a rear wall of the railroad boxcar 110 as opposed to the roof 112 of the railroad boxcar 110 or on the front of the locomotive pushing or pulling the railroad boxcar 110. Another problem only a cross-plane LiDAR sensor configuration can solve is the ability to detect planar surfaces that are perpendicular to the railroad tracks of a railroad corridor. LiDAR sensors that are mounted so the scan planes are perpendicular to the direction of travel (like on the front of a locomotive) are not able to measure surfaces that are also perpendicular to the direction of travel such as, for example, sign faces and building walls. In contrast, LiDAR sensors configured with a scan angle of more or less than 90 degrees as described herein (nominally about 79 degrees for the second LiDAR sensor 108B as shown in FIG. 5 shown as angle ρ, and about 101 degrees for the first LiDAR sensor 108A shown as angle τ) to the direction of travel allows measurement on the back of a planar surface (e.g., a sign face) as the sensors 108 approach the planar surface with the first scan plane 120A from the first LiDAR sensor 108A, and on the front surface (by the second scan plane 120B) as the sensors 108 move past the sign (for a surface/sign on the B side of the car).

The LiDAR sensors 108 are used to gather point cloud data along a railroad corridor. Such point cloud data is used by the processor 106 to generate and interpret point clouds, revealing various features along a railroad corridor including signage, furniture, adjoining tracks, ballast profile, drainage ditch profile, embankments and tunnel walls. Real-time point clouds are generated by the processor, preferably in LAS file format. The point cloud data that is gathered and the generated point clouds are stored on a data storage device 130 in electrical communication with the computing system 104. The data storage system is preferably in the form of network-attached storage (NAS) computer data storage server. In order to produce a correctly referenced point cloud some additional devices are included in the system 100 including an Inertial Measurement Unit (IMU) 131 in electrical communication with the processor 106 as well as a geolocation device such as, for example, a GPS device 132 in electrical communication with the processor 106. These additional devices help provide real-time LiDAR sensor 108 attitude information (based on the attitude of the boxcar 110 on which the LiDAR sensors 108 are installed) and real-time GPS position information in conjunction with the gathered LiDAR sensor point cloud data. The processor 106 controls operations of the first LiDAR sensor 108A and the second LiDAR sensor 108B and performs a method for generating and interpreting point clouds of a rail corridor. The method includes operations of obtaining a first set of point cloud data using the first LiDAR sensor 108A; obtaining a second set of point cloud data using the second LiDAR sensor 108B; obtaining boxcar 110 attitude information using the IMU 131; obtaining GPS information using the geo-location device 132; combining the first set of point cloud data together, the second set of point cloud data, the IMU attitude information, and GPS information to generate a combined point cloud using the processor 106; identifying rail corridor features of interest found in the combined point cloud using the processor 106; creating an inventory of the identified rail corridor features of interest using the processor 106; and storing the combined point cloud and the inventory of identified rail corridor features on the data storage device 130.

In addition to the processor 106, the computing system preferably further includes one or more LiDAR controllers, a local data storage server and a high-performance compute graphics processing unit (GPU) server. The LiDAR sensors 108 used are preferably Riegl VUX-1HA sensors available from RIEGL Laser Measurement Systems GmbH based in Horn, Austria. Raw and post-processed trajectory and LiDAR sensor data are archived to the data storage device 130 for back-office re-processing and analysis. The railroad corridor assessment system 100 is capable of gathering data and generating point clouds with survey grade accuracy while the railroad corridor assessment platform 102 is moving at speeds up to and even greater than 70 miles per hour on a railroad track. Electrical power for the various devices described in this disclosure can be provided by a diesel generator onboard the railroad corridor assessment platform 102 and/or photovoltaic solar panels, or set of batteries on the railroad corridor assessment platform 102. Preferably, batteries are available on the railroad corridor assessment platform 102 and are charged by an onboard generator and one or more photovoltaic solar panels mounted on the roof of the railroad corridor assessment platform 102. In addition, individual devices may include individualized backup battery power from smaller batteries in electrical communication with individualized devices.

In addition to the LiDAR sensors 108, the railroad corridor assessment system 100 also preferably includes a plurality of first sensor enclosure high resolution cameras 134 and a plurality of second sensor enclosure high resolution cameras 136. The plurality of first sensor enclosure high resolution cameras 134 preferably includes at least a first sensor enclosure first high-resolution camera 134A and a first sensor enclosure second high resolution camera 134B. In the embodiments shown in FIGS. 3 and 5-8, there is also a first sensor enclosure third high resolution camera 134C. Similarly, the plurality of second sensor enclosure high resolution cameras 136 preferably includes at least a second sensor enclosure first high-resolution camera 136A and a second sensor enclosure second high resolution camera 136B. In the embodiments shown in FIGS. 3 and 5-8, there is also a second sensor enclosure third high resolution camera 136C. As indicated by their names, the first sensor enclosure high resolution cameras 134 are located in the first sensor enclosure 116A and the second sensor enclosure high resolution cameras 136 are located in the second sensor enclosure 116B. The first sensor enclosure high resolution cameras 134 and the second sensor enclosure high resolution cameras 136 are all in electrical communication with and are controlled by the computing system 104.

The first sensor enclosure 116A includes a first sensor enclosure outer shell 138A including a first sensor enclosure outer shell first aperture 140A, a first sensor enclosure outer shell second aperture 140B, and a first sensor enclosure outer shell third aperture 140C. The first sensor enclosure first high-resolution camera 134A is oriented to view from the inside of the first sensor enclosure 116A through the first sensor enclosure outer shell first aperture 140A to gather digital image data of a rail corridor. The first sensor enclosure second high resolution camera 134B is oriented to view from the inside of the first sensor enclosure 116A through the first sensor enclosure outer shell second aperture 140B to gather digital image data of a rail corridor. The first sensor enclosure third high resolution camera 134C is oriented to view from the inside of the first sensor enclosure 116A through the first sensor enclosure outer shell third aperture 140C to gather digital image data of a rail corridor.

The second sensor enclosure 116B includes a second sensor enclosure outer shell 138B including a second sensor enclosure outer shell first aperture 142A, a second sensor enclosure outer shell second aperture 142B, and a second sensor enclosure outer shell third aperture 142C. The second sensor enclosure first high-resolution camera 136A is oriented to view from the inside of the second sensor enclosure 116B through the second sensor enclosure outer shell first aperture 142A to gather digital image data of a rail corridor. The second sensor enclosure second high resolution camera 136B is oriented to view from the inside of the second sensor enclosure 116B through the second sensor enclosure outer shell second aperture 142B to gather digital image data of a rail corridor. The second sensor enclosure third high resolution camera 136C is oriented to view from the inside of the second sensor enclosure 116B through the second sensor enclosure outer shell third aperture 142C to gather digital image data of a rail corridor.

As shown in the Figures, in embodiments in which three high-resolution digital cameras are used, preferably one of the three cameras is facing up, one of the three cameras is facing out to the side away from the railroad boxcar 110, and one of the three cameras is facing down. Using all six high-resolution digital cameras, it is possible to generate a combined 360-degree panoramic digital image of a rail corridor using the processor 106. The digital image data from each camera (134A, 134B, 134C, 136A, 136B, and 136C) are synchronized using a boxcar wheel mounted shaft encoder 143. Preferably, the shaft encoder 143 uses a 10,000 pulse per revolution producing a pulse every 0.287 millimeter (mm). The encoder pulses are divided to produce a camera trigger every 1.5 to 2 meters while the railroad boxcar 110 is moving at 70 miles per hour. This trigger is used to acquire an image from all six cameras (134A, 134B, 134C, 136A, 136B, and 136C) at the same instance and position so the images can be combined into a single panoramic image. They cannot be accurately combined, nor geo-referenced as a panoramic image, if they are not acquired at the same instance. The processor performs a method for generating and interpreting digital image data. The method includes operations of obtaining a first set of digital image data using the first sensor enclosure first high resolution camera 134A being triggered by signals from the shaft encoder 143; obtaining a second set of digital image data using the first sensor enclosure second high resolution camera 134B being triggered by signals from the shaft encoder 143; obtaining a third set of digital image data using the first sensor enclosure third high resolution camera 134C being triggered by signals from the shaft encoder 143; obtaining a fourth set of digital image data using the second sensor enclosure first high resolution camera 136A being triggered by signals from the shaft encoder 143; obtaining a fifth set of digital image data using the second sensor enclosure second high resolution camera 136B being triggered by signals from the shaft encoder 143; obtaining a sixth set of digital image data using the second sensor enclosure third high resolution camera 136C being triggered by signals from the shaft encoder 143; combining the first set of digital image data, the second set of digital image data, the third set of digital image data, the fourth set of digital image data, the fifth set of digital image data, and the sixth set of digital image data to form a combined set of digital image data including a plurality of digital images and generating a combined panoramic digital image of the rail corridor using the processor 106; time stamping the plurality of digital images using the processor 106; and storing the combined set of digital image data on the data storage device 130. The time stamping of the digital image data allows for geo-referencing and/or coloring a generated LiDAR point cloud by superimposing the generated LiDAR point cloud with the combined panoramic digital image of the rail corridor. Acquired images are preferably able to resolve text with a font height as small as 2 inches at a distance of from about 2 meters to about 15 meters. The combined panoramic digital image of the rail corridor provides a way to visually assess site conditions at the point and time an image of a specific site is obtained and generated by the railroad corridor assessment system 100.

Figure 8:
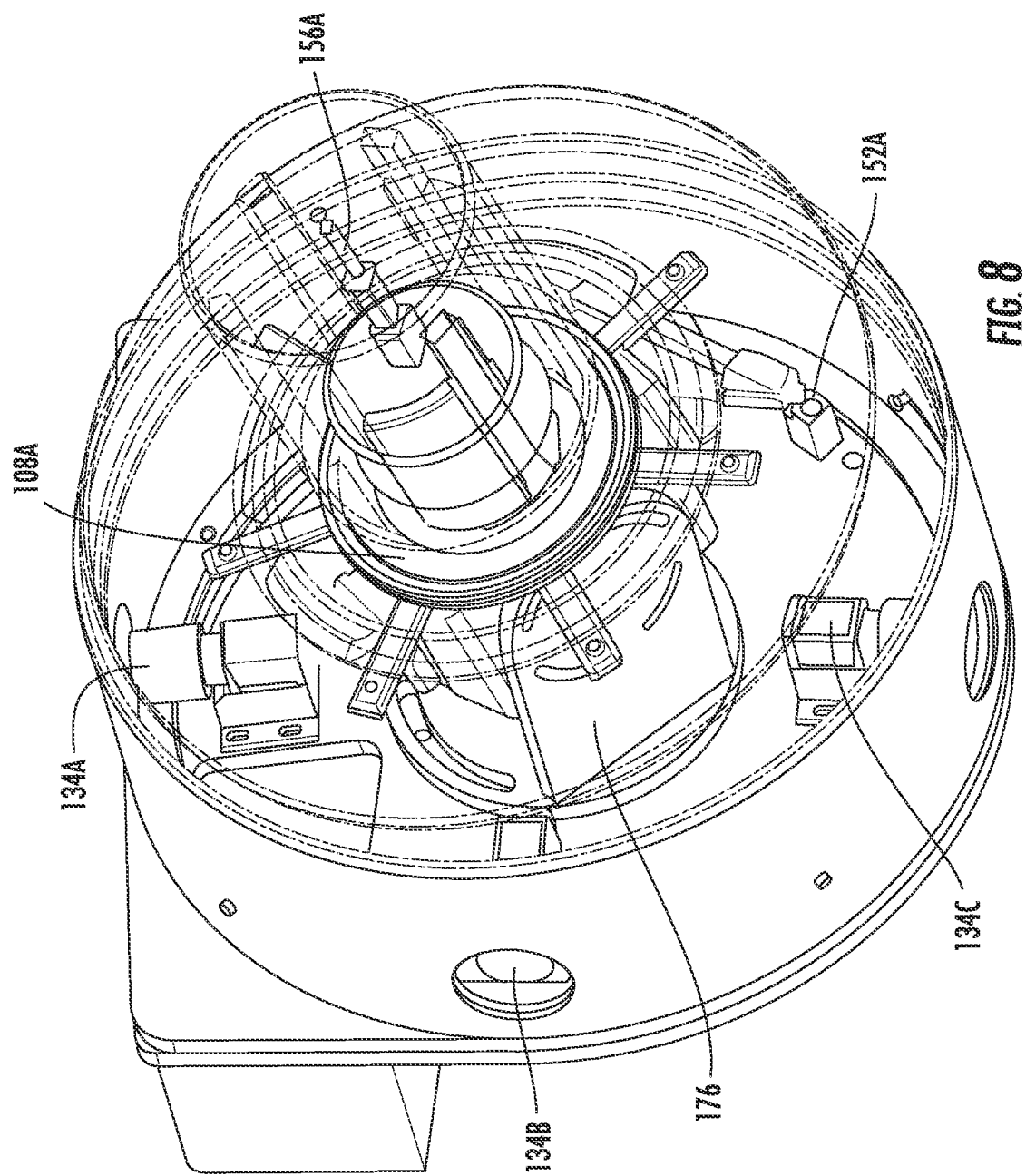
FIG. 8 shows a partially transparent perspective view looking at and into the first sensor enclosure.
Figure 9:
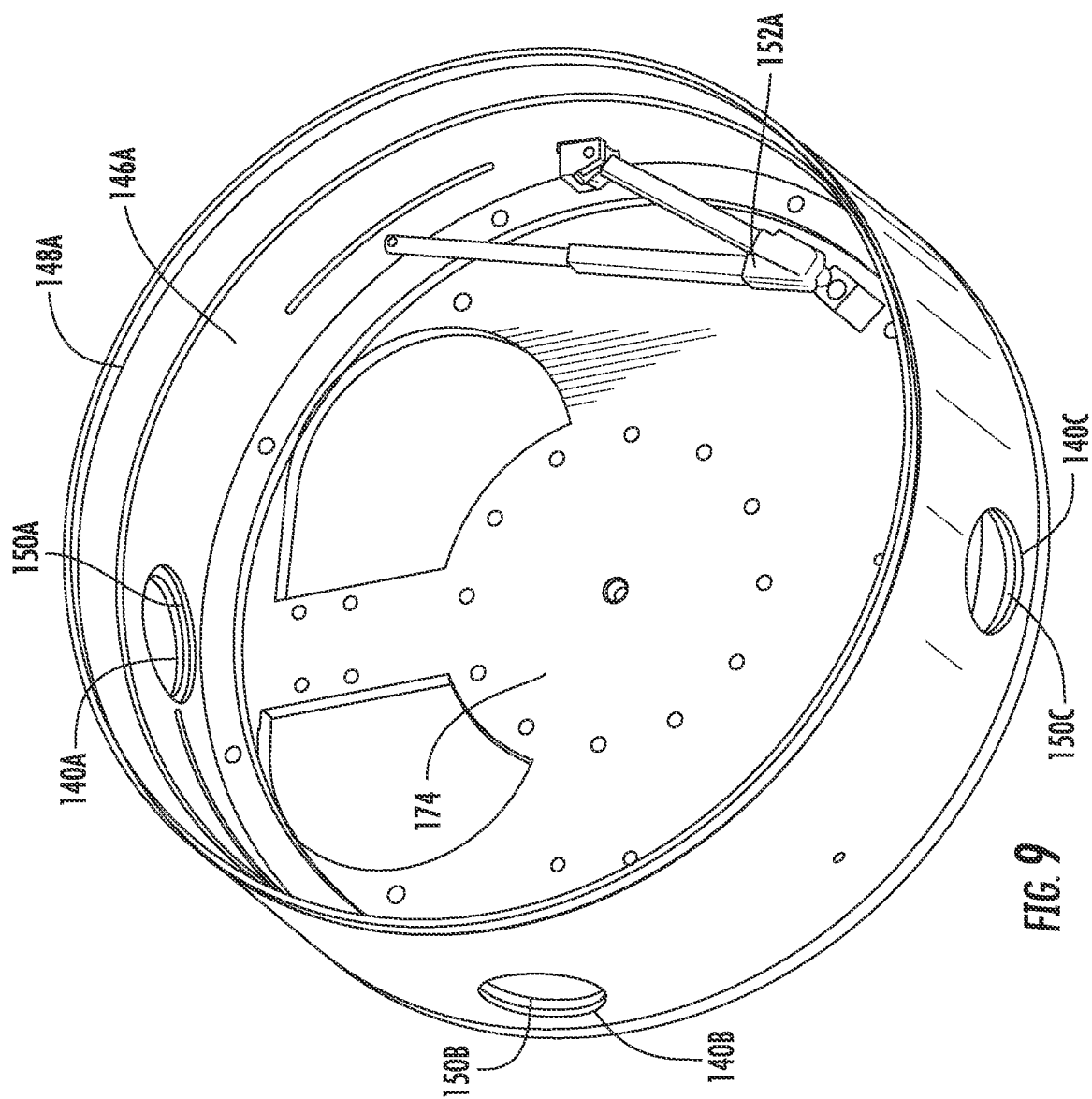
FIG. 9 shows a first sensor enclosure outer shell and mounting plate along with a first sensor enclosure inner shell motorized linear actuator.
Figure 10:
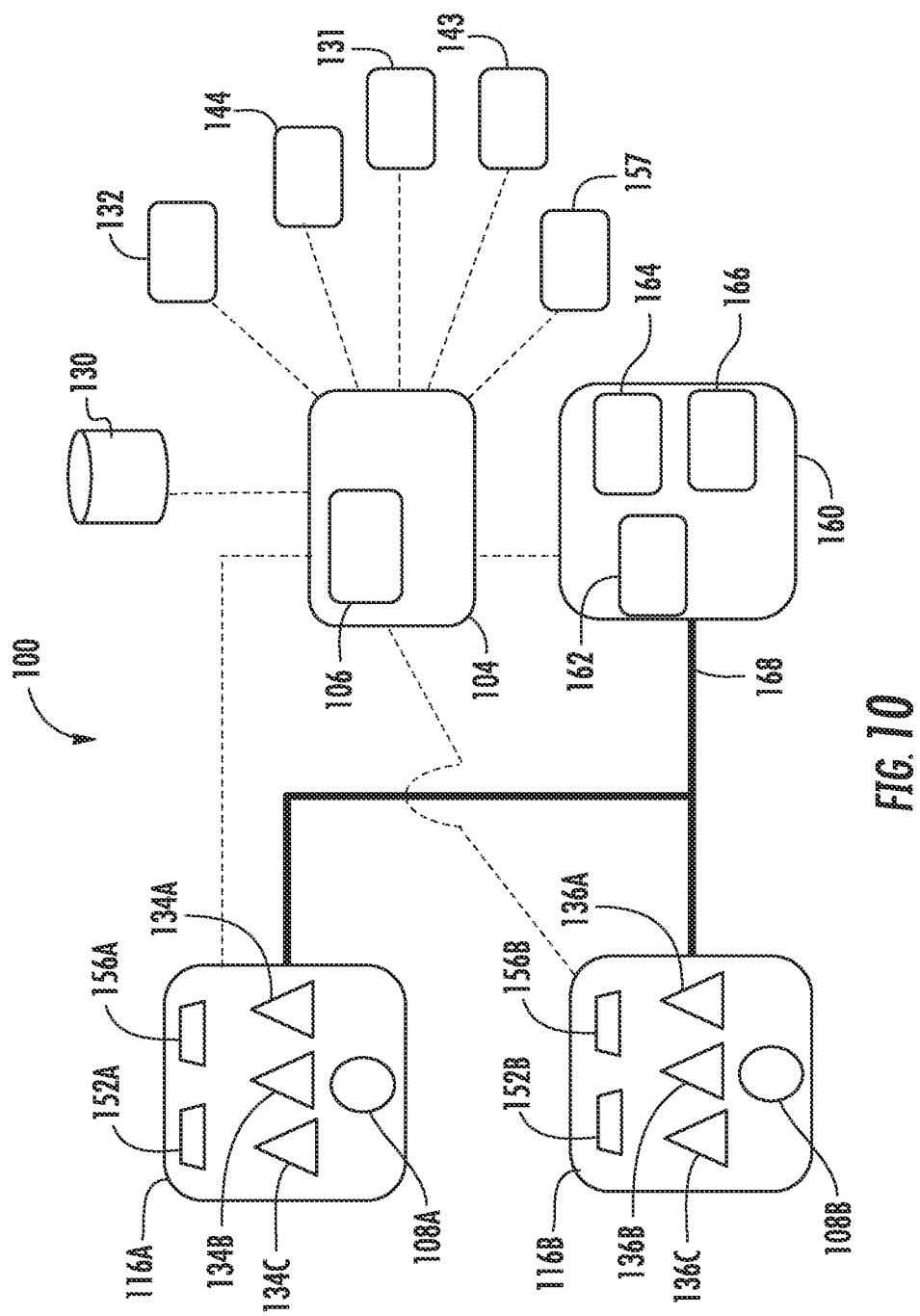
FIG. 10 shows a simple schematic of the railroad corridor assessment system including electrical connections from a computing system to various components of the first sensor enclosure and the second sensor enclosure as well as air flow connections through a duct from a heating and cooling system to the first sensor enclosure and the second sensor enclosure.

Because high-resolution digital cameras and their attached optic lens are sensitive equipment, it is undesirable to have such devices exposed to the elements in inclement weather, airborne debris or other detrimental conditions. The sensor enclosures 116 shown in the FIGS. 3-9 provide a way to address this problem. First, the railroad corridor assessment system 100 preferably includes a climatic conditions sensor 144 in data communication with the computing system 104. The climatic sensor 144 may actually include a plurality of sensors to detect different types of weather conditions. One important condition for determination is whether there is precipitation and the severity of the precipitation. When a minimum threshold of precipitation programmed into the computing system 104 is detected by the climatic sensor 144, data is sent to the computing system 104 to take further action to autonomously protect the high-resolution digital cameras (134A, 134B, 134C, 136A, 136B, and 136C). Similarly, after a precipitation event has ended, the climatic sensor 144 communicates the new weather status to the computing system 104 to re-expose the digital cameras (134A, 134B, 134C, 136A, 136B, and 136C) to the elements and enable gathering additional digital images. In order to protect the digital cameras (134A, 134B, 134C, 136A, 136B, and 136C), the first sensor enclosure 116A includes a round first sensor enclosure inner shell 146A and the second sensor enclosure 116B includes a round second sensor enclosure inner shell 146A. As shown in FIG. 3, FIG. 8 and FIG. 9, the first sensor enclosure inner shell 146A fits inside a round first sensor enclosure outer shell wall 148A and the first sensor enclosure 116A is configured so that the first sensor enclosure inner shell 146A can rotate and move relative to the first sensor enclosure outer shell wall 148A. The first sensor enclosure inner shell 146A includes a first sensor enclosure inner shell first aperture 150A, a first sensor enclosure inner shell second aperture 150B, and a first sensor enclosure inner shell third aperture 150C which line up with the first sensor enclosure outer shell first aperture 140A, the first sensor enclosure outer shell second aperture 140B, and the first sensor enclosure outer shell third aperture 140C, respectively, when the first sensor enclosure inner shell 146A is in a first sensor enclosure inner shell open position (see FIG. 9), exposing the first sensor enclosure first high resolution camera 134A, the first sensor enclosure second high resolution camera 134B, and the first sensor enclosure third high resolution camera 134C to weather outside the first sensor enclosure 116A. The first sensor enclosure 116A includes a first inner shell motorized linear actuator 152A in electrical communication with the processor 106 and connected to the first sensor enclosure inner shell 146A and a first sensor enclosure mounting plate 174A wherein the mounting plate 174A is mounted to the rear wall 114A of the railroad boxcar 110. The first inner shell motorized linear actuator 152A is controlled by the processor 106 to move the first sensor enclosure inner shell 146A from the first sensor enclosure inner shell open position (see FIG. 9) to a first sensor enclosure inner shell closed position (see FIG. 5 and FIG. 6) wherein the respective apertures no longer line up and the first sensor enclosure inner shell 146A blocks the first sensor enclosure outer shell first aperture 140A, the first sensor enclosure outer shell second aperture 140B, and the first sensor enclosure outer shell third aperture 140C, thereby protecting the first sensor enclosure first high resolution camera 134A, the first sensor enclosure second high resolution camera 134B, and the first sensor enclosure third high resolution camera 134C from weather outside the first sensor enclosure 116A. The exact same features are found on the second sensor enclosure 116B which includes a second inner shell motorized linear actuator 152B in electrical communication with the processor 106 and which is connected to a second sensor enclosure inner shell 146B and a second sensor enclosure mounting plate 174B wherein the mounting plate 174B is mounted to the rear wall 114 of the railroad boxcar. The second inner shell motorized linear actuator 152B is controlled by the processor 106 to move the second sensor enclosure inner shell 146B from a second sensor enclosure inner shell open position (wherein second sensor enclosure first high resolution camera 136A, the second sensor enclosure second high resolution camera 136B, and the second sensor enclosure third high resolution camera 136C are exposed through a second sensor enclosure inner shell first aperture 154A, a second sensor enclosure inner shell second aperture 154B, and a second sensor enclosure inner shell third aperture 154C, respectively) to a second sensor enclosure inner shell closed position (wherein the second sensor enclosure inner shell 146B blocks the second sensor enclosure outer shell first aperture 142A, the second sensor enclosure outer shell second aperture 142B, and the second sensor enclosure outer shell third aperture 142C), thereby protecting the second sensor enclosure first high resolution camera 136A, the second sensor enclosure second high resolution camera 136B, and the second sensor enclosure third high resolution camera 136C from weather outside the second sensor enclosure 116B.

Figure 6:
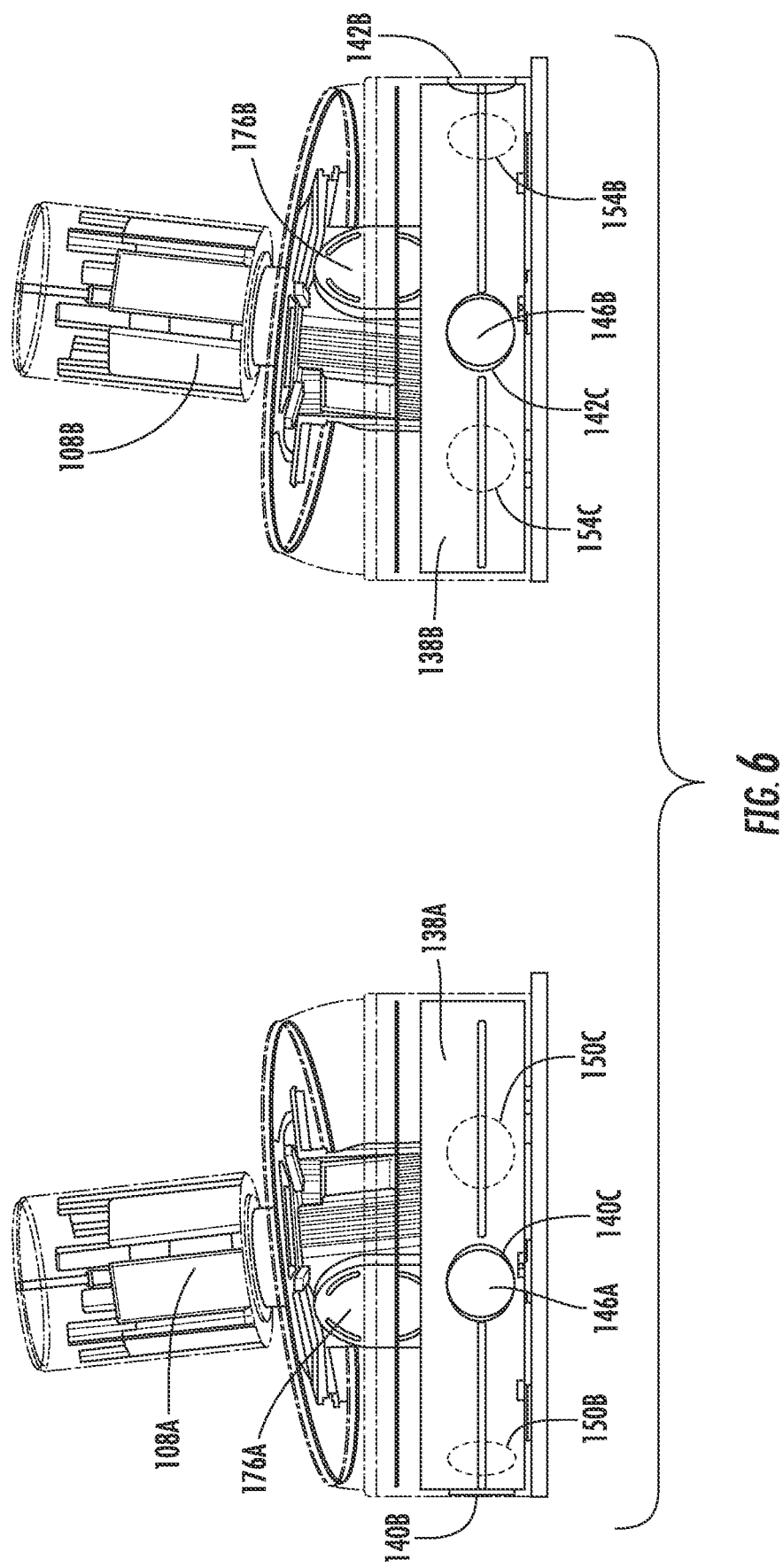
FIG. 6 shows a partially transparent view looking up and into the first sensor enclosure and the second sensor enclosure as they would be mounted on the railroad boxcar wherein the first LiDAR sensor and the second LiDAR sensor are configured in preferred orientations to gather point cloud data.
Figure 7:
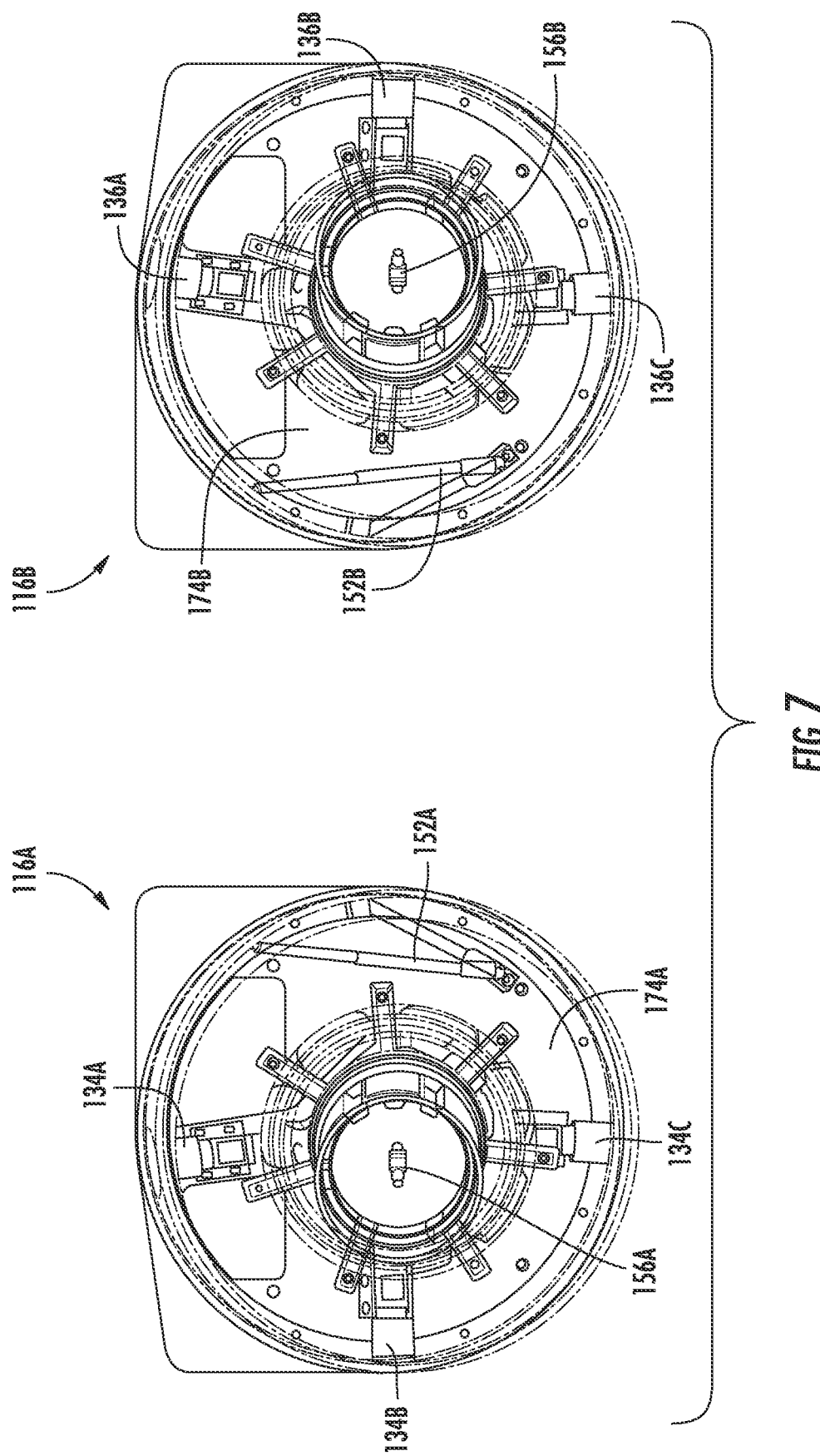
FIG. 7 shows a partially transparent end view looking directly at the first sensor enclosure and the second sensor enclosure as they would be mounted on a rear wall the railroad boxcar wherein the first LiDAR sensor and the second LiDAR sensor are configured in preferred orientations to gather point cloud data.

In addition to protecting the digital cameras (134A, 134B, 134C, 136A, 136B, and 136C) and associated lenses, the sensor enclosures 116 are also configured to protect the LiDAR sensors 108 as well. FIG. 3A shows a side cross-sectional view of the first sensor enclosure 116A wherein the LiDAR sensor 108A is exposed and collect data. FIG. 3B shows the same view as FIG. 3A except in FIG. 3B, the LiDAR sensor is not exposed. A first sensor enclosure LiDAR cap 155A is used to protect the first LiDAR sensor 108A and can be moved relative to the first sensor enclosure outer shell 138A from a first sensor enclosure cap open position shown in FIG. 3A to a first sensor enclosure cap closed position shown in FIG. 3B by a first LiDAR cap motorized linear actuator 156A which is in electrical communication with the processor 106 and which is connected to the first sensor enclosure LiDAR cap 155A and a distal end 159A of the first LiDAR sensor 108A as shown in FIG. 3A. Both the first sensor enclosure 116A and the second sensor enclosure 116B have this same configuration including a second sensor enclosure cap open position in which the second LIDAR sensor 108B is exposed and a second sensor enclosure cap closed position in which the second LiDAR sensor 108B is concealed and protected. As shown in FIGS. 5 and 6, the second enclosure 116B includes a second sensor enclosure LiDAR cap 155B for protecting the second LiDAR sensor 108B. The second sensor enclosure 116B also includes a second LiDAR cap motorized linear actuator 156B in electrical communication with the processor 106 and connected to the second sensor enclosure LiDAR cap and a distal end of the second LiDAR sensor 108B. The LiDAR caps 155 can be opened or closed using the LiDAR cap motorized linear actuators 156 based on signals sent by the processor 106, wherein such signals are generated by the processor 106 based on data from another source such as, for example, a clock, the climatic sensor 144, or a motion sensor 157 discussed in more detail below.

In some embodiments, the processor performs a method for protecting the LiDAR sensors (108A and 108B) and the high-resolution cameras (134A, 134B, 134C, 136A, 136B, and 136C). The method includes operations of receiving climatic conditions data from the climatic sensor 144; using the processor 106 to activate the first inner shell motorized linear actuator 152A to move the first sensor enclosure inner shell 146A from the first sensor enclosure inner shell open position to the first sensor enclosure inner shell closed position and activate the first LiDAR cap motorized linear actuator 156A to move the first sensor enclosure LiDAR cap 155A from the first sensor enclosure inner shell open position to the first sensor enclosure inner shell closed position based on the received climatic conditions data; and using the processor to activate the second inner shell motorized linear actuator 152B to move the second sensor enclosure inner shell 146B from the second sensor enclosure inner shell open position to the second sensor enclosure inner shell closed position and activate the second LiDAR cap motorized linear actuator 156B to move the second sensor enclosure LiDAR cap 155B from the second sensor enclosure cap open position to the second sensor enclosure cap closed position based on the received climatic conditions data. This usually would occur in inclement weather. If the climatic sensor 144 sends data to the processor indicating that it is safe to expose the high-resolution cameras (134A, 134B, 134C, 136A, 136B, and 136C) to allow for the cameras to obtain data, a method includes operations of receiving climatic conditions data from the climatic sensor 144; using the processor 106 to activate the first inner shell motorized linear actuator 152A to move the first sensor enclosure inner shell 146A from the first sensor enclosure inner shell closed position to the first sensor enclosure inner shell open position and activate the first LiDAR cap motorized linear actuator 156A to move the first sensor enclosure LiDAR cap 155A from the first sensor enclosure cap closed position to the first sensor enclosure cap open position based on the received climatic conditions data; and using the processor to activate the second inner shell motorized linear actuator 152B to move the second sensor enclosure inner shell 146B from the second sensor enclosure inner shell closed position to the second sensor enclosure inner shell open position and activate the second LiDAR cap motorized linear actuator 156B to move the second sensor enclosure LiDAR cap 155B from the second sensor enclosure cap closed position to the second sensor enclosure cap open position based on the received climatic conditions data.

The railroad corridor assessment system 100 also preferably includes a motion sensor 157 for detecting motion of the railroad corridor assessment platform 102. Depending on data received from the motion sensor 157 to the computing device 104, the processor 106 preferably (1) activates the first inner shell motorized linear actuator 152A to move the first sensor enclosure inner shell 146A to the first sensor enclosure inner shell open position (see FIG. 9) and activates the first LiDAR cap motorized linear actuator 156A to move the first sensor enclosure LiDAR cap 155A to the first sensor enclosure cap open position (see FIG. 3A) when the railroad corridor assessment platform 102 is moving and (2) activates the first inner shell motorized linear actuator 152A to move the first sensor enclosure inner shell 146A to the first sensor enclosure inner shell closed position (see FIG. 5 and FIG. 6) and activates the first LiDAR cap motorized linear actuator 156A to move the first sensor enclosure LiDAR cap 155A to the first sensor enclosure cap closed position (see FIG. 3B) when the railroad corridor assessment platform 102 stops moving. Similarly, the processor 106 also preferably activates the second inner shell motorized linear actuator 152B to move the second sensor enclosure inner shell 146B to the second sensor enclosure inner shell open position and activates the second LiDAR cap motorized linear actuator 156B to move the second sensor enclosure LiDAR cap 155B to the first sensor enclosure cap open position (see FIG. 3A) when the railroad corridor assessment platform 102 is moving and activates the second inner shell motorized linear actuator 152B to move the second sensor enclosure inner shell 146A to the second sensor enclosure inner shell closed position and activates the second LiDAR cap motorized linear actuator 156B to move the second sensor enclosure LiDAR cap 155B to the second sensor enclosure cap closed position when the railroad corridor assessment platform 102 stops moving. The motion sensor 157 is broadly defined as any device providing data to the processor 106 giving an indication that the railroad corridor assessment platform 102 is moving or that the railroad corridor assessment platform 102 has stopped moving.

As indicated above, the processor 106 controls operations of the first inner shell motorized linear actuator 152A and the second inner shell motorized linear actuator 152B. In some embodiments, the processor performs a method for protecting the high-resolution cameras (134 and 136). The method includes operations of receiving a motion sensor signal from the motion sensor 157 indicating that the railroad corridor assessment platform 102 has stopped moving relative to a railroad track or is moving below a minimum speed threshold programmed into the computing system 104; using the processor 106 to activate the first inner shell motorized linear actuator 152A to move the first sensor enclosure inner shell 146A from the first sensor enclosure inner shell open position to the first sensor enclosure inner shell closed position based on the received motion sensor signal; and using the processor 106 to activate the second inner shell motorized linear actuator 152B to move the second sensor enclosure inner shell 146B from the second sensor enclosure inner shell open position to the second sensor enclosure inner shell closed position based on the received motion sensor signal. These steps are usually performed if the railroad corridor assessment platform 102 has ceased moving along a railroad track. If, on the other hand, the railroad corridor assessment platform 102 starts moving from a stalled or stopped state, in some embodiments, the processor performs a method for exposing the high-resolution cameras (134 and 136) so that they can gather data. The method includes operations of receiving a motion sensor signal from the motion sensor 157 indicating that the railroad corridor assessment platform 102 has started moving relative to a railroad track at or above a minimum speed threshold programmed into the computing system 104; using the processor 106 to activate the first inner shell motorized linear actuator 152A to move the first sensor enclosure inner shell 146A from the first sensor enclosure inner shell closed position to the first sensor enclosure inner shell open position based on the received motion sensor signal; and using the processor 106 to activate the second inner shell motorized linear actuator 152B to move the second sensor enclosure inner shell 146B from the second sensor enclosure inner shell closed position to the second sensor enclosure inner shell open position based on the received motion sensor signal.

As indicated above, the railroad corridor assessment system 100 and other systems like it are vulnerable to extreme weather conditions and flying dirt and debris in disturbed air created by a consist moving at speed along a rail corridor. The features described above regarding the first sensor enclosure 116A and the second sensor enclosure 116B address some weather concerns. In addition to these features, the railroad corridor assessment system 100 includes a temperature sensor 158 on the railroad corridor assessment platform 102 in electrical communication with the computing system 104 and proximate to the first sensor enclosure 116A and the second sensor enclosure 116B. In some embodiments there are separate temperature sensors including a first temperature sensor 158A in the first sensor enclosure 116A and a second temperature sensor 158B in the second sensor enclosure 116B. The railroad corridor assessment system 100 preferably includes a heating and cooling system 160 in electrical communication with the computing system 104. The heating and cooling system 160 preferably includes an air blower 162, a heater 164 for heating air blown from the air blower 162, an air chiller 166 for cooling air blown from the air blower 162, and an air duct 168 in fluid communication with the heating and cooling system 160 and the sensor enclosures 116 for channeling air from the air blower 162 to the first sensor enclosure 116A and the second sensor enclosure 116B. Preferably, the heater 164 and chiller 166 include a combination heater/chiller 167 such as, for example, a Peltier thermoelectric heating and cooling device capable of providing heating or cooling depending on electrical control signals received by such device from the processor 106. Depending on temperature readings from the first temperature sensor 158A and the second temperature sensor 158B sent to the computing system 104, the processor 106 can be programmed to activate the air blower 162 in addition to either the heating or cooling function of the combination heater/chiller 164 depending on whether the sensor enclosures 116 need to be heated or cooled. If temperatures in the sensor enclosures 116 are within an acceptable range, the processor 106 optionally can activate only the air blower 162 to circulate air to and through the sensor enclosures 116. The climate control features allow the system 100 to operate in extreme weather and climate conditions.

Figure 4:
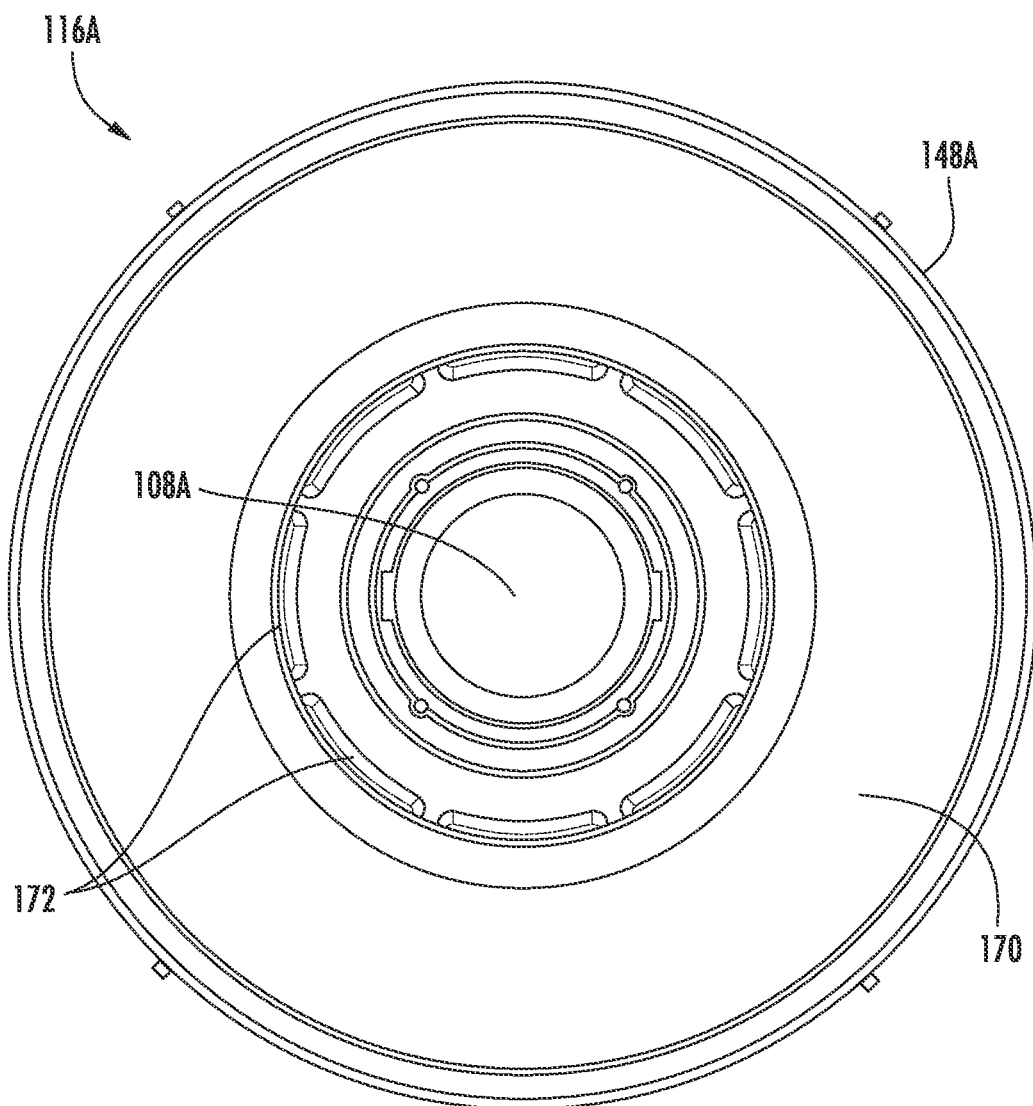
FIG. 4 shows a close-up end view of the first sensor enclosure shown in FIGS. 1-3B.

The sensor enclosures 116 each include a sensor enclosure outer cap (170A and 170B) and the LiDAR sensor caps (155A and 155B) shown in FIG. 3A, FIG. 3B and FIG. 4. The sensor enclosure outer cap design includes a plurality of cap apertures 172 through which blown air from the air blower 162 exits the enclosures 116 and is used as an air curtain to prevent dirt, debris or precipitation from interfering with the lens of LiDAR sensors 108. These features also allow for warm air to exit the sensor enclosures 116 from the air blower 162 heated by the heater 164 to melt snow and ice that would otherwise form around the LiDAR sensors 108 and digital cameras (134 and 136) in cold weather. As such, if the motion sensor 156 communicates to the computing system 104 that the railroad corridor assessment platform 102 is moving, the processor can be programmed to automatically activate the air blower 162 so that air will flow out the cap apertures 172 to blow away flying dirt and debris. In one embodiment, the processor 106 performs a method for regulating air temperature in the first sensor enclosure 116A and the second sensor enclosure 116B and the method includes the operations of receiving temperature data from the temperature sensor 158, activating the air blower 162, and activating the heater 164 or the chiller 166 based on the received temperature data (or, in the case of a single device, the combination heater/chiller 167). If the temperature in the first sensor enclosure 116A and the second sensor enclosure 116B rises above an upper threshold programmed into the computing system 104, the processor 106 can be programmed to automatically activate the air blower 162 and the air combination heater/chiller 164 to provide cool air. If, on the other hand, the temperature in the first sensor enclosure 116A and the second sensor enclosure 116B falls below a lower threshold programmed into the computing system 104, the processor 160 can be programmed to automatically activate the air blower 162 and the combination heater/chiller 164 to provide heated air.

Figure 11A:
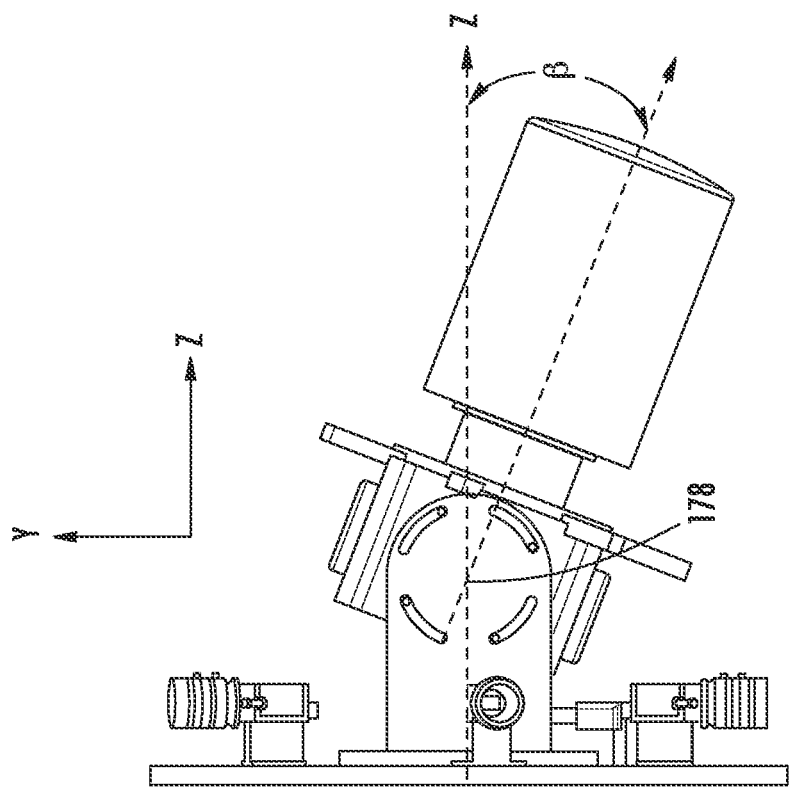
FIG. 11A shows a first side view of the first sensor enclosure with the outer shell removed to reveal a range of preferred orientations of the first LiDAR sensor along a Z,Y plane with the first LiDAR sensor being rotatable along an X axis coming out of the page at point 178.
Figure 11B:
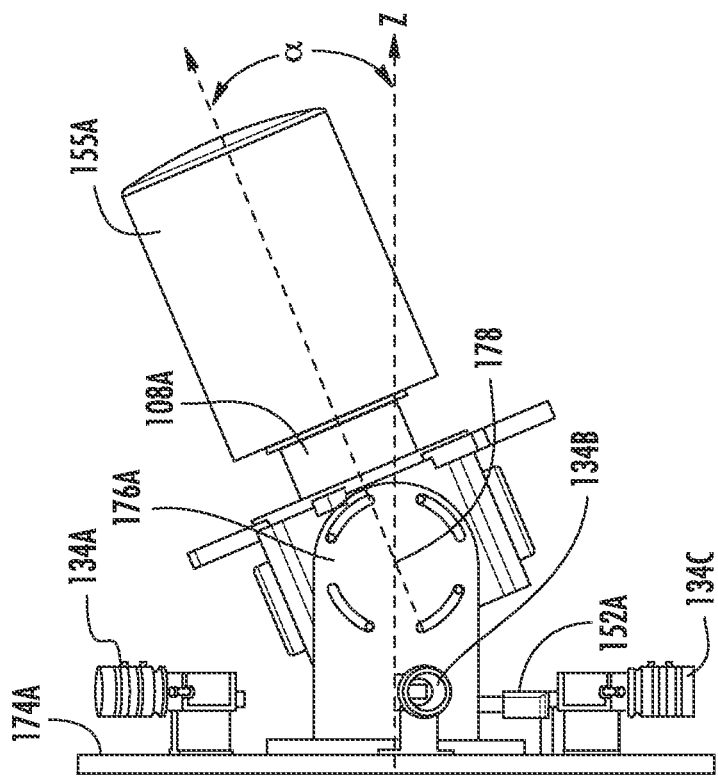
FIG. 11B shows a second side view of the first sensor enclosure with the outer shell removed to reveal a range of preferred orientations of the first LiDAR sensor along a Z,Y plane with the first LiDAR sensor being rotatable along an X axis coming out of the page at point 178.

With reference to FIGS. 3 and 5-8, each sensor enclosure 116 includes a mounting plate (174A and 174B) for mounting the enclosures 116 to the back wall 114A of the railroad boxcar 110. Each enclosure 116 also includes an internal frame member 176 (first internal frame member 176A and second internal frame member 176B) configured to be attached on the mounting plate 174 (first mounting plate 174A and second mounting plate 174B) along a first plane substantially parallel with the rear wall 114A of the railroad boxcar 110. The position of the internal frame member 176 can be swiveled to a new position by loosening attachment devices (e.g., bolts, screws, or other attachment devices known to persons having ordinary skill in the art), rotating the internal frame member 176 and any LiDAR sensor attached thereto), and retightening the attachment devices with the internal frame member 176 reoriented at a different angle. For each separate enclosure, a LiDAR sensor (e.g., first LiDAR sensor 108A) is attached to an internal frame member (e.g., first frame member 176A) in a hinged configuration as shown so that the LiDAR sensors 108 can rotate relative to the internal frame members 176 in the enclosures 116 along an X axis as shown in FIG. 11A and FIG. 11B. For reference, the axes (X, Y, and Z) in a standard Cartesian coordinate system as defined herein are shown in FIG. 11A, FIG. 11B, FIG. 12A, and FIG. 12B with the non-listed axis being orthogonal to the drawing sheet. For example, in FIG. 11A and FIG. 11B, the X axis is orthogonal to the drawing sheet and comes out the page at point 178. In FIG. 12A and FIG. 12B, the Z axis is orthogonal to the drawing sheet and comes out of the page at point 180. FIG. 12A and FIG. 12B show a view along a Y,Z oriented plane of the first sensor enclosure 116A with the first sensor enclosure outer shell wall 148A and sensor enclosure outer cap 170 removed to show internal parts. The range of rotation of the first LiDAR sensor 108A along the X axis preferably ranges from about +23 degrees (shown as angle α in FIG. 11A) to about −23 degrees (shown as angle β in FIG. 11B). The range of rotation of the first LiDAR sensor along the Z axis preferably ranges from about +32 degrees (shown as angle θ in FIG. 12A) to about −32 degrees (shown as angle ω in FIG. 12B). If the LiDAR sensors 108 are not rotated at all, the first scan plane 120A and the second scan plane 120B overlap completely (are coplanar at all points) along the X,Y plane shown in FIG. 13 (or a plane parallel to the X,Y plane). However, the first LiDAR sensor 108A and the second LiDAR sensor 108B are oriented in the manner shown in FIGS. 5, 6, and 12A-15. Because of the unique orientations of the first LiDAR sensor 108 and the second LiDAR sensor 108B described and shown herein, a full 360-degree scan to gather point cloud data can be accomplished using the railroad corridor assessment system 100 between the rear wall 114A of the railroad boxcar 110 and a front wall of an adjoining railroad boxcar if another boxcar is adjoined to the railroad boxcar. As shown in FIG. 13 and FIG. 14, despite the example adjoining boxcar 122 being coupled very close to the railroad boxcar 110 and the LiDAR sensors 108 along the back wall 114A of the railroad boxcar, the first scan plane 120A and the second scan plane 120B have clear "views" to gather point cloud data without the adjoining box car 122 interfering with such scans.

The previously described embodiments of the present disclosure have many advantages, including gathering LiDAR point cloud data from a standard-sized railroad boxcar that can easily be added to or removed from a consist. The specific orientation of the LiDAR sensors 108 allows for the gathering of point cloud data even if another boxcar is coupled directly behind the railroad corridor assessment platform 102. The LiDAR sensors enclosures 116 are situated below a roofline of the railroad corridor assessment platform 102. Point clouds can be assessed in real-time by the processor 106 to identify and inventory various features along a rail corridor such as signage, furniture, adjoining tracks, and Positive Train Control (PTC) assets. The processor can use the generated point cloud(s) to measure ballast profiles, measure drainage ditch profiles, and identify and measure of embankments and tunnel walls. If the same survey path is run more than once, on the later survey(s), the processor 106 can be programmed to detect changes in the features that were previously detected in the point clouds of a prior survey by comparing the new and old point clouds. The point cloud data is geo-referenced and time stamped to correlate such data with new or additional data.

An additional advantage is the use of a plurality of digital cameras to gather a 360-degree panoramic ribbon digital image of a rail corridor. The image data is preferably time-stamped and can be combined with the LiDAR point cloud data to add color to the point cloud(s). The sensitive cameras are protected in the sensor enclosures 116 which automatically open or close depending on (1) the weather and (2) whether the railroad corridor assessment platform 102 is moving at a minimum speed. The heating and cooling system 160 provides temperature-controlled air to the sensor enclosures 116 so that the system 100 can keep operating even in extreme heat or cold. Additionally, the enclosures 116 include cap apertures through which the temperature-controlled air can exit the enclosures 116 ad, while exiting, act like an air curtain to blow away any flying dust or debris from the devise in the enclosures 116.

The foregoing description of preferred embodiments of the present disclosure has been presented for purposes of illustration and description. The described preferred embodiments are not intended to be exhaustive or to limit the scope of the disclosure to the precise form(s) disclosed. For example, various features said to be in electrical communication with one another may be communicating wirelessly and powered locally by batteries or other power sources. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

What is claimed is:

1. A system for generating and interpreting point clouds of a rail corridor along a survey path while moving on a railroad corridor assessment platform, the system comprising:
   a. a railroad corridor assessment platform;
   b. a first LiDAR sensor configured to scan along a first scan plane, the first LiDAR sensor attached to the railroad corridor assessment platform in a rear-facing direction;
   c. a second LiDAR sensor configured to scan along a second scan plane, the second LiDAR sensor attached to the railroad corridor assessment platform in a rear-facing direction, wherein the first scan plane crosses the second scan plane but is not coplanar at all points with the second scan plane and wherein neither the first scan plane nor the second scan plane intersect a main body of any rail car adjoined to a rear end of the railroad corridor assessment platform;
   d. a data storage device;
   e. an Inertial Measurement Unit (IMU);
   f. a geo-location device; and
   g. a high performance computing system in electrical communication with the first LiDAR sensor, the second LiDAR sensor, the data storage device, the IMU, and the geo-location device, the computing system comprising a high-performance processor wherein the processor controls operations of the first LiDAR sensor and the second LiDAR sensor, and wherein the processor performs a method for generating and interpreting point clouds of a rail corridor, the method comprising operations of:
      i. obtaining a first set of point cloud data using the first LiDAR sensor;
      ii. obtaining a second set of point cloud data using the second LiDAR sensor;
      iii. obtaining railroad corridor assessment platform attitude information using the IMU;
      iv. obtaining geo-location information using the geo-location device;
      v. combining the first set of point cloud data together, the second set of point cloud data, the railroad corridor platform attitude information, and the geo-location information to generate a combined point cloud;
      vi. identifying rail corridor features of interest found in the combined point cloud;
      vii. creating an inventory of the identified rail corridor features of interest; and
      viii. storing the combined point cloud on the data storage device.

2. The system for generating and interpreting point clouds of a rail corridor of claim 1 further comprising:
   a. a first sensor enclosure further comprising:
      i. a first sensor enclosure outer shell comprising a first sensor enclosure outer shell first aperture and a first sensor enclosure outer shell second aperture;

ii. a first sensor enclosure first high resolution camera in electrical communication with the computing system, the first sensor enclosure first high resolution camera oriented to view from the inside of the first sensor enclosure through the first sensor enclosure outer shell first aperture to gather digital image data of a rail corridor; and iii. a first sensor enclosure second high resolution camera in electrical communication with the computing system, the first sensor enclosure second high resolution camera oriented to view from the inside of the first sensor enclosure through the first sensor enclosure outer shell second aperture to gather digital image data of a rail corridor; and b. a second sensor enclosure further comprising:

i. a second sensor enclosure outer shell comprising a second sensor enclosure outer shell first aperture and a second sensor outer shell second aperture;

ii. a second sensor enclosure first high resolution camera in electrical communication with the computing system, the second sensor enclosure first high resolution camera oriented to view from the inside of the second sensor enclosure through the second sensor enclosure outer shell first aperture to gather digital image data of a rail corridor; and iii. a second sensor enclosure second high resolution camera in electrical communication with the computing system, the second sensor enclosure second high resolution camera oriented to view from the inside of the second sensor enclosure through the second sensor enclosure outer shell second aperture to gather digital image data of a rail corridor.

3. The system for generating and interpreting point clouds of a rail corridor of claim 2 further comprising:

a. a wheel mounted shaft encoder for sending trigger signals to the first sensor enclosure first high resolution camera, the first sensor enclosure second high resolution camera, the second sensor enclosure first high resolution camera, and the second sensor enclosure second high resolution camera as the railroad corridor assessment platform moves along a survey path;

b. the high-performance processor wherein the processor controls operations of the first sensor enclosure first high resolution camera, the first sensor enclosure second high resolution camera, the second sensor enclosure first high resolution camera, and the second sensor enclosure second high resolution camera, and wherein the processor performs a method for generating and interpreting digital image data, the method comprising operations of:

i. receiving pulses from the shaft encoder and triggering the first sensor enclosure first high resolution camera, the first sensor enclosure second high resolution camera, the second sensor enclosure first high resolution camera, and the second sensor enclosure second high resolution camera to obtain digital image data at the same time instances;

ii. obtaining a first set of digital image data using the first sensor enclosure first high resolution camera;

iii. obtaining a second set of digital image data using the first sensor enclosure second high resolution camera;

iv. obtaining a third set of digital image data using the second sensor enclosure first high resolution camera;

v. obtaining a fourth set of digital image data using the second sensor enclosure second high resolution camera;

vi. combining the first set of digital image data, the second set of digital image data, the third set of digital image data, and the fourth set of digital image data to form a combined set of digital image data comprising a plurality of digital images and generating a combined panoramic digital image of the rail corridor; and vii. storing the combined set of digital image data on the data storage device.

4. The system for generating and interpreting point clouds of a rail corridor of claim 2 further comprising:

a. the first sensor enclosure further comprising:

i. a first sensor enclosure inner shell comprising a first sensor enclosure inner shell first aperture and a first sensor enclosure inner shell second aperture, wherein the first sensor enclosure inner shell is configured to move relative to the first sensor enclosure outer shell from a first sensor enclosure inner shell open position wherein the first sensor enclosure outer shell first aperture is in line with the first sensor enclosure inner shell first aperture and the first sensor enclosure outer shell second aperture is in line with the first sensor enclosure inner shell second aperture to a first sensor enclosure inner shell closed position wherein the first sensor enclosure outer shell first aperture is not in line with the first sensor enclosure inner shell first aperture and the first sensor enclosure outer shell second aperture is not in line with the first sensor enclosure inner shell second aperture resulting in (1) the first sensor enclosure outer shell first aperture being blocked by the first sensor enclosure inner shell to protect the first sensor enclosure first high resolution camera and (2) the first sensor enclosure outer shell second aperture being blocked by the first sensor enclosure inner shell to protect the first sensor enclosure second high resolution camera; and ii. a first inner shell motorized linear actuator in electrical communication with the computing system and connected to the first sensor enclosure inner shell for moving the first sensor enclosure inner shell from the first sensor enclosure inner shell open position to the first sensor enclosure inner shell closed position or from the first sensor enclosure inner shell closed position to the first sensor enclosure inner shell open position depending upon control instructions from the computing system;

iii. a first sensor enclosure LiDAR cap configured to move from a first sensor enclosure cap open position in which the first LiDAR sensor is exposed to a first sensor enclosure cap closed position in which the first LiDAR sensor is not exposed, and from the first sensor enclosure cap closed position to the first sensor enclosure cap open position; and iv. a first LiDAR cap motorized actuator in electrical communication with the computing system and connected to the first sensor enclosure LiDAR cap for moving the first sensor enclosure LiDAR cap from the first sensor enclosure cap closed position to the first sensor enclosure cap open position or from the first sensor enclosure cap open position to the first sensor enclosure cap closed position depending on control instructions from the computing system; and b. the second sensor enclosure further comprising i. a second sensor enclosure inner shell comprising a second sensor enclosure inner shell first aperture and a second sensor enclosure inner shell second aperture, wherein the second sensor enclosure inner shell is configured to move relative to the second sensor enclosure outer shell from a second sensor enclosure inner shell open position wherein the second sensor enclosure outer shell first aperture is in line with the second sensor enclosure inner shell first aperture and the second sensor enclosure outer shell second aperture is in line with the second sensor enclosure inner shell second aperture to a second sensor enclosure inner shell closed position wherein the second sensor enclosure outer shell first aperture is not in line with the second sensor enclosure inner shell first aperture and the second sensor enclosure outer shell second aperture is not in line with the second sensor enclosure inner shell second aperture resulting in (1) the second sensor enclosure outer shell first aperture being blocked by the second sensor enclosure inner shell to protect the second sensor enclosure first high resolution camera and (2) the second sensor enclosure outer shell second aperture being blocked by the second sensor enclosure inner shell to protect the second sensor enclosure second high resolution camera; and ii. a second inner shell motorized linear actuator in electrical communication with the computing system and connected to the second sensor enclosure inner shell for moving the second sensor enclosure inner shell from the second sensor enclosure inner shell open position to the second sensor enclosure inner shell closed position or from the second sensor enclosure inner shell closed position to the second sensor enclosure inner shell open position depending upon control instructions from the computing system;

iii. a second sensor enclosure LiDAR cap configured to move from a second sensor enclosure cap open position in which the second LiDAR sensor is exposed to a second sensor enclosure cap closed position in which the second LiDAR sensor is not exposed, and from the second sensor enclosure cap closed position to the second sensor enclosure cap open position; and iv. a second LiDAR cap motorized actuator in electrical communication with the computing system and connected to the second sensor enclosure LiDAR cap for moving the second sensor enclosure LiDAR cap from the second sensor enclosure cap closed position to the second sensor enclosure cap open position or from the second sensor enclosure cap open position to the second sensor enclosure cap closed position depending on control instructions from the computing system.

5. The system for generating and interpreting point clouds of a rail corridor of claim 4 further comprising:
   a. a climatic sensor on the railroad corridor assessment platform, the climatic sensor in electrical communication with the computing system; and
   b. the high-performance processor wherein the processor controls operations of the first inner shell motorized linear actuator and the second inner shell motorized linear actuator, and wherein the processor performs a method for protecting the first sensor enclosure first high resolution camera, the first sensor enclosure second high resolution camera, the second sensor enclosure first high resolution camera, and the second sensor enclosure second high resolution camera, the method comprising operations of:
      i. receiving climatic conditions data from the climatic sensor;
      ii. activating the first inner shell motorized linear actuator to move the first sensor enclosure inner shell from the first sensor enclosure inner shell open position to the first sensor enclosure inner shell closed position based on the received climatic conditions data;
      iii. activating the second inner shell motorized linear actuator to move the second sensor enclosure inner shell from the second sensor enclosure inner shell open position to the second sensor enclosure inner shell closed position based on the received climatic conditions data;
      iv. activating the first LiDAR cap motorized actuator to move the first sensor enclosure LiDAR cap from the first sensor enclosure cap open position to the first sensor enclosure cap closed position; and
      v. activating the second LiDAR cap motorized actuator to move the second sensor enclosure LiDAR cap from the second sensor enclosure cap open position to the second sensor enclosure cap closed position.

6. The system for generating and interpreting point clouds of a rail corridor of claim 4 further comprising:
   a. a motion sensor for sensing motion of the railroad corridor assessment platform, the motion sensor in electrical communication with the computing system; and
   b. the high-performance processor wherein the processor controls operations of the first inner shell motorized linear actuator and the second inner shell motorized linear actuator, and wherein the processor performs a method for protecting the first sensor enclosure first high resolution camera, the first sensor enclosure second high resolution camera, the second sensor enclosure first high resolution camera, and the second sensor enclosure second high resolution camera, the method comprising operations of:
      i. receiving a motion sensor signal from the motion sensor indicating that the railroad corridor assessment platform is moving relative to a railroad track below a minimum speed threshold programmed into the computing system;
      ii. activating the first inner shell motorized linear actuator to move the first sensor enclosure inner shell from the first sensor enclosure inner shell open position to the first sensor enclosure inner shell closed position based on the received motion sensor signal;
      iii. activating the second inner shell motorized linear actuator to move the second sensor enclosure inner shell from the second sensor enclosure inner shell open position to the second sensor enclosure inner shell closed position based on the received motion sensor signal;
      iv. activating the first LiDAR cap motorized actuator to move the first sensor enclosure LiDAR cap from the first sensor enclosure cap open position to the first sensor enclosure cap closed position; and
      v. activating the second LiDAR cap motorized actuator to move the second sensor enclosure LiDAR cap from the second sensor enclosure cap open position to the second sensor enclosure cap closed position.

7. The system for generating and interpreting point clouds of a rail corridor of claim 2 further comprising:
   a. a temperature sensor on the railroad corridor assessment platform in electrical communication with the computing system and proximate to the first sensor enclosure and the second sensor enclosure;

b. a heating and cooling system in electrical communication with the computing system, the heating and cooling system further comprising:
  i. an air blower;
  ii. a heater for heating air blown from the air blower;
  iii. an air chiller for cooling air blown from the air blower; and
  iv. an air duct for channeling air from the air blower to the first sensor enclosure and the second sensor enclosure; and
c. the high-performance processor wherein the processor controls operations of the heating and cooling system, and wherein the processor performs a method for regulating air temperature in the first sensor enclosure and the second sensor enclosure, the method comprising operations of:
  i. receiving temperature data from the temperature sensor;
  ii. activating the air blower; and
  iii. activating the heater or the air chiller based on the received temperature data.

8. The system for generating and interpreting point clouds of a rail corridor of claim 7 further comprising:
a. the first sensor enclosure further comprising at least one first sensor air aperture through which air can directed across the first LiDAR sensor; and
b. the second sensor enclosure further comprising at least one second sensor air aperture through which air can directed across the second LiDAR sensor.

9. A method for generating and interpreting point clouds of a rail corridor, the method comprising:
a. obtaining a first set of point cloud data using a processor and a first LiDAR sensor oriented to scan along a first scan plane and attached to a railroad corridor assessment platform in a rear-facing orientation wherein the first LiDAR sensor is in electrical communication with the processor;
b. obtaining a second set of point cloud data using the processor and a second LiDAR sensor oriented to scan along a second scan plane and attached to the railroad corridor assessment platform in a rear-facing orientation wherein the second LiDAR sensor is in electrical communication with the processor, wherein the first scan plane crosses the second scan plane but is not coplanar at all points with the second scan plane, and wherein neither the first scan plane nor the second scan plane intersect a main body of any rail car adjoined to a rear end of the railroad corridor assessment platform;
c. obtaining railroad corridor assessment platform attitude data using an Inertial Measurement Unit (IMU) in electrical communication with the processor;
d. obtaining geo-location data of the railroad corridor assessment platform using a geo-location device in electrical communication with the processor;
e. combining the first set of point cloud data, the second set of point cloud data, the railroad corridor assessment platform attitude data, and the geo-location data to generate a combined point cloud using the processor;
f. identifying rail corridor features of interest found in the combined point cloud using the processor;
g. creating an inventory of the identified rail corridor features of interest using the processor; and
h. storing the combined point cloud on a data storage device in electrical communication with the processor.

10. The method of claim 9 further comprising:
a. receiving pulses from a wheel mounted shaft encoder in electrical communication with the processor and triggering a first sensor enclosure first high resolution camera, a first sensor enclosure second high resolution camera, a second sensor enclosure first high resolution camera, and a second sensor enclosure second high resolution camera to obtain digital image data at the same time instances;
b. obtaining a first set of digital image data using the first sensor enclosure first high resolution camera;
c. obtaining a second set of digital image data using the first sensor enclosure second high resolution camera;
d. obtaining a third set of digital image data using the second sensor enclosure first high resolution camera;
e. obtaining a fourth set of digital image data using the second sensor enclosure second high resolution camera;
f. combining the first set of digital image data, the second set of digital image data, the third set of digital image data, and the fourth set of digital image data to form a combined set of digital image data comprising a plurality of digital images and generating a combined panoramic digital image of a rail corridor; and
g. storing the combined set of digital image data on a data storage device in electrical communication with the processor.

11. The method of claim 10 further comprising colorizing the combined point cloud using the combined set of digital image data and the processor.

12. The method of claim 10 further comprising:
a. triggering a first sensor enclosure third high resolution camera and a second sensor enclosure third high resolution camera to obtain digital image data at the same time instances as the first sensor enclosure first high resolution camera, the first sensor enclosure second high resolution camera, the second sensor enclosure first high resolution camera, and the second sensor enclosure second high resolution camera;
b. obtaining a fifth set of digital image data using a first sensor enclosure third high resolution camera;
c. obtaining a sixth set of digital image data using a second sensor enclosure third high resolution camera;
d. combining the first set of digital image data, the second set of digital image data, the third set of digital image data, the fourth set of digital image data, the fifth set of digital image data and the sixth set of digital image data to form a combined set of digital image data comprising a plurality of digital images and generating a combined panoramic digital image of a rail corridor.

13. The method of claim 11 further comprising geo-referencing the colorized combined point cloud using a geo-referencing device.

14. The method of claim 12 further comprising:
a. housing the first LiDAR sensor, the first sensor enclosure first high resolution camera, the first sensor enclosure second high resolution camera, and the first sensor enclosure third high resolution camera in a first sensor enclosure including a first sensor enclosure LiDAR cap for protecting the first LiDAR sensor;
b. housing the second LiDAR sensor, the second sensor enclosure first high resolution camera, the second sensor enclosure second high resolution camera, and the second sensor enclosure third high resolution camera in a second sensor enclosure including a second sensor enclosure LiDAR cap for protecting the second LiDAR sensor;
c. blowing temperature-controlled air to the first sensor enclosure and the second sensor enclosure using a heating and cooling system including an air blower wherein temperature-controlled air is blown through an air duct to the first sensor enclosure and the second sensor enclosure and wherein the heating and cooling system is controlled by the computing system based on temperature data received by a temperature sensor proximate to the first LiDAR sensor and the second LiDAR sensor.

15. The method of claim 14 further comprising:
a. blowing temperature-controlled air through an aperture in the first sensor enclosure adjacent to the first LiDAR sensor for blowing away flying debris and precipitation from the first LiDAR sensor and to maintain the first sensor enclosure LiDAR cap at a temperature above freezing to eliminate the accumulation of frozen precipitation; and
b. blowing temperature-controlled air through an aperture in the second sensor enclosure adjacent to the second LiDAR sensor for blowing away flying debris and precipitation from the second LiDAR sensor and to maintain the second sensor enclosure LiDAR cap at a temperature above freezing to eliminate the accumulation of frozen precipitation.

16. The method of claim 10 further comprising:
a. housing the first LiDAR sensor in a first sensor enclosure comprising:
   i. a first sensor enclosure LiDAR cap configured to move from a first sensor enclosure cap open position in which the first LiDAR sensor is exposed to a first sensor enclosure cap closed position in which the first LiDAR sensor is not exposed, and from the first sensor enclosure cap closed position to the first sensor enclosure cap open position; and
   ii. a first LiDAR cap motorized linear actuator in electrical communication with the computing system and connected to the first sensor enclosure LiDAR cap for moving the first sensor enclosure LiDAR cap from the first sensor enclosure cap closed position to the first sensor enclosure cap open position or from the first sensor enclosure cap open position to the first sensor enclosure cap closed position depending on control instructions from the computing system;
b. housing the first sensor enclosure first high-resolution camera in the first sensor enclosure comprising:
   i. a first sensor enclosure outer shell;
   ii. a first sensor enclosure outer shell first aperture through which the first sensor enclosure first high-resolution camera obtains digital image data;
   iii. a first sensor enclosure inner shell configured to move relative to the first sensor outer shell from a first sensor enclosure inner shell open position wherein the first sensor enclosure outer shell first aperture is open and the first sensor enclosure first high-resolution camera is exposed to weather outside the first sensor enclosure to a first sensor enclosure inner shell closed position wherein the first sensor enclosure outer shell first aperture is blocked by the first sensor inner shell and the first sensor enclosure first high-resolution camera is not exposed to weather outside the first sensor enclosure;
c. housing the first sensor enclosure second high-resolution camera in the first sensor enclosure comprising:
   i. a first sensor enclosure outer shell second aperture through which the first sensor enclosure second high-resolution camera obtains digital image data;
   ii. the first sensor enclosure inner shell configured to move relative to the first sensor enclosure outer shell from the first sensor enclosure inner shell open position wherein the first sensor enclosure outer shell second aperture is open and the first sensor enclosure second high-resolution camera is exposed to weather outside the first sensor enclosure to the first sensor enclosure inner shell closed position wherein the first sensor enclosure outer shell second aperture is blocked by the first sensor inner shell and the first sensor enclosure second high-resolution camera is not exposed to weather outside the first sensor enclosure;
   iii. a first inner shell motorized linear actuator connected to the first sensor enclosure inner shell and in electrical communication with the processor for moving the first sensor enclosure inner shell from the first sensor enclosure inner shell open position to the first sensor enclosure inner shell closed position and from the first sensor enclosure inner shell closed position to the first sensor enclosure inner shell open position depending on instructions from the processor;
d. housing the second LiDAR sensor in a second sensor enclosure comprising:
   i. a second sensor enclosure LiDAR cap configured to move from a second sensor enclosure cap open position in which the second LiDAR sensor is exposed to a second sensor enclosure cap closed position in which the second LiDAR sensor is not exposed, and from the second sensor enclosure cap closed position to the second sensor enclosure cap open position; and
   ii. a second LiDAR cap motorized linear actuator in electrical communication with the computing system and connected to the second sensor enclosure LiDAR cap for moving the second sensor enclosure LiDAR cap from the second sensor enclosure cap closed position to the second sensor enclosure cap open position or from the second sensor enclosure cap open position to the second sensor enclosure cap closed position depending on control instructions from the computing system;
e. housing the second sensor enclosure first high-resolution camera in the second sensor enclosure comprising:
   i. a second sensor enclosure outer shell;
   ii. a second sensor enclosure outer shell first aperture through which the second sensor enclosure first high-resolution camera obtains digital image data;
   iii. a second sensor enclosure inner shell configured to move relative to the second sensor outer shell from a second sensor enclosure inner shell open position wherein the second sensor enclosure outer shell first aperture is open and the second sensor enclosure first high-resolution camera is exposed to weather outside the second sensor enclosure to a second sensor inner shell closed position wherein the second sensor enclosure outer shell first aperture is blocked by the second sensor inner shell and the second sensor enclosure first high-resolution camera is not exposed to weather outside the second sensor enclosure; and
f. housing the second sensor enclosure second high-resolution camera in the second sensor enclosure comprising:
   i. a second sensor enclosure outer shell second aperture through which the second sensor enclosure second high-resolution camera obtains digital image data;
   ii. the second sensor enclosure inner shell configured to move relative to the second sensor enclosure outer shell from the second sensor enclosure inner shell open position wherein the second sensor enclosure outer shell second aperture is open and the second sensor enclosure second high-resolution camera is exposed to weather outside the second sensor enclosure to the second sensor enclosure inner shell closed position wherein the second sensor enclosure outer shell second aperture is blocked by the second sensor inner shell and the second sensor enclosure second high-resolution camera is not exposed to weather outside the second sensor enclosure; and
   iii. a second inner shell motorized linear actuator connected to the second sensor enclosure inner shell and in electrical communication with the processor for moving the second sensor enclosure inner shell from the second sensor enclosure inner shell open position to the second sensor enclosure inner shell closed position and from the second sensor enclosure inner shell closed position to the second sensor enclosure inner shell open position depending on instructions from the processor.

17. The method of claim 16 further comprising:
a. detecting weather conditions outside the first sensor enclosure and the second sensor enclosure using a climatic sensor in electrical communication with the processor;
b. activating the first inner shell motorized linear actuator to move the first sensor enclosure inner shell from the first sensor enclosure inner shell open position to the first sensor enclosure inner shell closed position based on information received by the processor from the climatic sensor;
c. activating the second inner shell motorized linear actuator to move the second sensor enclosure inner shell from the second sensor enclosure inner shell open position to the second sensor enclosure inner shell closed position based on information received by the processor from the climatic sensor;
d. activating the first LiDAR cap motorized linear actuator to move the first sensor enclosure LiDAR cap from the first sensor enclosure cap open position to the first sensor enclosure cap closed position; and
e. activating the second LiDAR cap motorized linear actuator to move the second sensor enclosure LiDAR cap from the second sensor enclosure cap open position to the second sensor enclosure cap closed position.

18. The method of claim 16 further comprising:
a. detecting movement of the railroad corridor assessment platform using a motion sensor;
b. activating the first inner shell motorized linear actuator to move the first sensor enclosure inner shell from the first sensor enclosure inner shell open position to the first sensor enclosure inner shell closed position based on information received by the processor from the motion sensor;
c. activating the second inner shell motorized linear actuator to move the second sensor enclosure inner shell from the second sensor enclosure inner shell open position to the second sensor enclosure inner shell closed position based on information received by the processor from the motion sensor;
d. activating the first LiDAR cap motorized actuator to move the first sensor enclosure LiDAR cap from the first sensor enclosure cap open position to the first sensor enclosure cap closed position; and
e. activating the second LiDAR cap motorized actuator to move the second sensor enclosure LiDAR cap from the second sensor enclosure cap open position to the second sensor enclosure cap closed position.

19. The system for generating and interpreting point clouds of a rail corridor of claim 1 further comprising:
a. a first sensor enclosure in which the first LiDAR sensor is housed;
b. a second sensor enclosure in which the second LiDAR sensor is housed;
c. a temperature sensor in electrical communication with the computing system and located proximate to the first LiDAR sensor and the second LiDAR sensor;
d. a heating and cooling system in electrical communication with the computing system, the heating and cooling system further comprising:
   i. an air blower;
   ii. a heater for heating air blown from the air blower;
   iii. an air chiller for cooling air blown from the air blower; and
   iv. a duct for channeling air from the air blower to the first sensor enclosure and the second sensor enclosure depending on temperature data sent by the temperature sensor to the computing system.

20. A system for generating and interpreting point clouds of a rail corridor along a survey path while moving on a railroad corridor assessment platform, the system comprising:
a. a railroad corridor assessment platform;
b. a first LiDAR sensor configured to scan along a first scan plane, the first LiDAR sensor attached to the railroad corridor assessment platform in a rear-facing direction;
c. a second LiDAR sensor configured to scan along a second scan plane, the second LiDAR sensor attached to the railroad corridor assessment platform in a rear-facing direction, wherein the first scan plane crosses the second scan plane but is not coplanar at all points with the second scan plane and wherein neither the first scan plane nor the second scan plane intersect a main body of any rail car adjoined to a rear end of the railroad corridor assessment platform;
d. a data storage device;
e. an Inertial Measurement Unit (IMU);
f. a geo-location device; and
g. a high performance computing system in electrical communication with the first LiDAR sensor, the second LiDAR sensor, the data storage device, the IMU, and the geo-location device, the computing system comprising a high-performance processor wherein the processor controls operations of the first LiDAR sensor and the second LiDAR sensor for obtaining and storing point cloud data.

21. The system for generating and interpreting point clouds of a rail corridor along a survey path while moving on a railroad corridor assessment platform of claim 20 further comprising:
a. a first sensor enclosure in which the first LiDAR sensor is housed;
b. a second sensor enclosure in which the second LiDAR sensor is housed;
c. a temperature sensor in electrical communication with the computing system and located proximate to the first LiDAR sensor and the second LiDAR sensor;
d. a heating and cooling system in electrical communication with and controlled by the computing system, the heating and cooling system further comprising:
   i. an air blower;
   ii. a heater for heating air blown from the air blower;

iii. an air chiller for cooling air blown from the air blower; and
iv. a duct for channeling air from the air blower to the first sensor enclosure and the second sensor enclosure depending on temperature data sent by the temperature sensor to the computing system.

22. The system for generating and interpreting point clouds of a rail corridor of claim 20 further comprising:
a. the first sensor enclosure further comprising:
i. a first sensor enclosure inner shell comprising a first sensor enclosure inner shell first aperture and a first sensor enclosure inner shell second aperture, wherein the first sensor enclosure inner shell is configured to move relative to the first sensor enclosure outer shell from a first sensor enclosure inner shell open position wherein the first sensor enclosure outer shell first aperture is in line with the first sensor enclosure inner shell first aperture and the first sensor enclosure outer shell second aperture is in line with the first sensor enclosure inner shell second aperture to a first sensor enclosure inner shell closed position wherein the first sensor enclosure outer shell first aperture is not in line with the first sensor enclosure inner shell first aperture and the first sensor enclosure outer shell second aperture is not in line with the first sensor enclosure inner shell second aperture resulting in (1) the first sensor enclosure outer shell first aperture being blocked by the first sensor enclosure inner shell to protect the first sensor enclosure first high resolution camera and (2) the first sensor enclosure outer shell second aperture being blocked by the first sensor enclosure inner shell to protect the first sensor enclosure second high resolution camera;
ii. a first inner shell motorized linear actuator in electrical communication with the computing system and connected to the first sensor enclosure inner shell for moving the first sensor enclosure inner shell from the first sensor enclosure inner shell open position to the first sensor enclosure inner shell closed position and from the first sensor enclosure inner shell closed position to the first sensor enclosure inner shell open position depending upon control instructions from the computing system;
iii. a first sensor enclosure LiDAR cap configured to move from a first sensor enclosure cap open position in which the first LiDAR sensor is exposed to a first sensor enclosure cap closed position in which the first LiDAR sensor is not exposed, and from the first sensor enclosure cap closed position to the first sensor enclosure cap open position; and
iv. a first LiDAR cap motorized actuator in electrical communication with the computing system and connected to the first sensor enclosure LiDAR cap for moving the first sensor enclosure LiDAR cap from the first sensor enclosure cap closed position to the first sensor enclosure cap open position or from the first sensor enclosure cap open position to the first sensor enclosure cap closed position depending on control instructions from the computing system; and
b. the second sensor enclosure further comprising
i. a second sensor enclosure inner shell comprising a second sensor enclosure inner shell first aperture and a second sensor enclosure inner shell second aperture, wherein the second sensor enclosure inner shell is configured to move relative to the second sensor enclosure outer shell from a second sensor enclosure inner shell open position wherein the second sensor enclosure outer shell first aperture is in line with the second sensor enclosure inner shell first aperture and the second sensor enclosure outer shell second aperture is in line with the second sensor enclosure inner shell second aperture to a second sensor enclosure inner shell closed position wherein the second sensor enclosure outer shell first aperture is not in line with the second sensor enclosure inner shell first aperture and the second sensor enclosure outer shell second aperture is not in line with the second sensor enclosure inner shell second aperture resulting in (1) the second sensor enclosure outer shell first aperture being blocked by the second sensor enclosure inner shell to protect the second sensor enclosure first high resolution camera and (2) the second sensor enclosure outer shell second aperture being blocked by the second sensor enclosure inner shell to protect the second sensor enclosure second high resolution camera;
ii. a second inner shell motorized linear actuator in electrical communication with the computing system and connected to the second sensor enclosure inner shell for moving the second sensor enclosure inner shell from the second sensor enclosure inner shell open position to the second sensor enclosure inner shell closed position and from the second sensor enclosure inner shell closed position to the second sensor enclosure inner shell open position depending upon control instructions from the computing system;
iii. a second sensor enclosure LiDAR cap configured to move from a second sensor enclosure cap open position in which the second LiDAR sensor is exposed to a second sensor enclosure cap closed position in which the second LiDAR sensor is not exposed, and from the second sensor enclosure cap closed position to the second sensor enclosure cap open position; and
iv. a second LiDAR cap motorized actuator in electrical communication with the computing system and connected to the second sensor enclosure LiDAR cap for moving the second sensor enclosure LiDAR cap from the second sensor enclosure cap closed position to the second sensor enclosure cap open position or from the second sensor enclosure cap open position to the second sensor enclosure cap closed position depending on control instructions from the computing system.

23. The system for generating and interpreting point clouds of a rail corridor of claim 20 further comprising a climatic sensor in electrical communication with the computing device.

24. The system for generating and interpreting point clouds of a rail corridor of claim 20 further comprising a motion sensor for sensing motion of the railroad corridor assessment platform and wherein the motion sensor is in electrical communication with the computing system.

* * * * *